(12) United States Patent
Wu

(10) Patent No.: US 12,550,167 B2
(45) Date of Patent: Feb. 10, 2026

(54) MANAGING TRANSMISSION AND RECEPTION OF MULTICAST AND BROADCAST SERVICES

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 248 days.

(21) Appl. No.: 18/033,330

(22) PCT Filed: Oct. 20, 2021

(86) PCT No.: PCT/US2021/055753
§ 371 (c)(1),
(2) Date: Apr. 21, 2023

(87) PCT Pub. No.: WO2022/087069
PCT Pub. Date: Apr. 28, 2022

(65) Prior Publication Data
US 2023/0397233 A1    Dec. 7, 2023

Related U.S. Application Data

(60) Provisional application No. 63/094,570, filed on Oct. 21, 2020.

(51) Int. Cl.
*H04W 28/02*  (2009.01)
*H04W 12/0431*  (2021.01)
*H04W 72/30*  (2023.01)

(52) U.S. Cl.
CPC ....... *H04W 72/30* (2023.01); *H04W 12/0431* (2021.01)

(58) Field of Classification Search
CPC ..... H04W 36/08; H04W 72/30; H04W 72/29; H04W 80/02; H04W 36/249;
(Continued)

(56) References Cited

U.S. PATENT DOCUMENTS

| 2013/0010671 | A1 | 1/2013 | Kim et al. | |
| 2015/0365963 | A1* | 12/2015 | Won | H04W 4/029 370/329 |
| 2024/0236619 | A1* | 7/2024 | Dai | H04W 76/40 |

FOREIGN PATENT DOCUMENTS

| EP | 3 866 508 A1 | 8/2021 |
| WO | WO-2011/106972 A1 | 9/2011 |

(Continued)

OTHER PUBLICATIONS

International Search Report and Written Opinion for Application No. PCT/US2021/055753, dated Jan. 24, 2022.

(Continued)

*Primary Examiner* — Phuoc H Doan
(74) *Attorney, Agent, or Firm* — MARSHALL, GERSTEIN & BORUN LLP

(57) ABSTRACT

A method in a base station for managing communication of multicast and/or broadcast services (MBS) includes causing (1402) establishment of a session for transmitting MBS data packets from a core network (CN) to a user equipment (UE). The method also includes transmitting (1404) configuration parameters associated with the session to the UE. Further, the method includes transmitting (1406) MBS data packets to the UE in accordance with the configuration parameters.

19 Claims, 16 Drawing Sheets

(58) Field of Classification Search
CPC ..... H04W 60/04; H04W 52/34; H04W 76/28; H04W 72/23; H04W 72/21; H04W 76/20; H04L 1/1854; H04B 1/3838
See application file for complete search history.

(56) References Cited

FOREIGN PATENT DOCUMENTS

| WO | WO-2021/149933 A1 | 7/2021 |
|----|-------------------|--------|
| WO | WO-2021/158024 A1 | 8/2021 |
| WO | WO-2021/159229 A1 | 8/2021 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 16)," 3GPP TS 36.321 V16.4.0 (2021).
Apple, "Subsequent data transmission for SDT," 3GPP TSG-RAN WG2 Meeting #114 bis electronic (2021).
ASUStek, "Beam management in SDT," 3GPP TSG-RAN WG2 Meeting #114 electronic (2021).
ASUStek, "Discussion on PDCCH monitoring for RA-SDT," 3GPP TSG-RAN WG2 Meeting #114 electronic (2021).
ETRI, "Beam selection and indication for subsequent SDT," 3GPP TSG-RAN WG2 #114-e (2021).
Lenovo, "Consideration on CP issues for small data transmission," 3GPP TSG-RAN WG2 Meeting #114 electronic (2021).
Nokia, "SDT control plane aspects," 3GPP TSG-RAN WG2 Meeting #114 Electronic (2021).
Sony, "CG-based SDT in NR," 3GPP TSG-RAN WG2 Meeting #114 electronic (2021).
ZTE Corporation, "Open issues for CG based SDT," 3GPP TSG-RAN WG2 #114-e (2021).

* cited by examiner

MANAGING TRANSMISSION AND RECEPTION OF MULTICAST AND BROADCAST SERVICES

FIELD OF THE DISCLOSURE

This disclosure relates to wireless communications and, more particularly, to enabling setup and/or modification of radio resources for transmission and/or reception of one or more multicast and/or broadcast services (MBS).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides services for signaling radio bearers (SRBs) to the Radio Resource Control (RRC) sublayer. The PDCP sublayer also provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

The UE in some scenarios can concurrently utilize resources of multiple nodes (e.g., base stations or components of a distributed base station or disaggregated base station) of a radio access network (RAN), interconnected by a backhaul. When these network nodes support different radio access technologies (RATs), this type of connectivity is referred to as Multi-Radio Dual Connectivity (MR-DC). When operating in MR-DC, the cell(s) associated with the base station operating as a master node (MN) define a master cell group (MCG), and the cells associated with the base station operating as a secondary node (SN) define the secondary cell group (SCG). The MCG covers a primary cell (PCell) and zero, one, or more secondary cells (SCells), and the SCG covers a primary secondary cell (PSCell) and zero, one, or more SCells. The UE communicates with the MN (via the MCG) and the SN (via the SCG). In other scenarios, the UE utilizes resources of one base station at a time, i.e., single connectivity (SC). The UE in SC only communicates with the MN (via the MCG). One base station and/or the UE determines that the UE should establish a radio connection with another base station. For example, one base station can determine to hand the UE over to the second base station, and initiate a handover procedure. The UE in other scenarios can concurrently utilize resources of a RAN node (e.g., a single base station or a component of a distributed base station or a disaggregated base station), interconnected by a backhaul.

UEs can use several types of SRBs and DRBs. So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MN or SN but using the lower-layer resources of both the MN and the SN can be referred to as split DRBs. DRBs terminated at the MN but using the lower-layer resources of only the SN can be referred to as MN-terminated SCG DRBs. DRBs terminated at the SN but using the lower-layer resources of only the MN can be referred to as SN-terminated MCG DRBs.

UEs can perform handover procedures to switch from one cell to another, whether in single connectivity (SC) or DC operation. These procedures involve messaging (e.g., RRC signaling and preparation) among RAN nodes and the UE. The UE may handover from a cell of a serving base station to a target cell of a target base station, or from a cell of a first distributed unit (DU) of a serving base station to a target cell of a second DU of the same base station, depending on the scenario. In DC scenarios, UEs can perform PSCell change procedures to change PSCells. These procedures involve messaging (e.g., RRC signaling and preparation) among RAN nodes and the UE. The UE may perform PSCell change from a PSCell of a serving SN to a target PSCell of a target SN, or from a PSCell of a source DU of a base station to a PSCell of a target DU of the same base station, depending on the scenario. Further, the UE may perform handover or PSCell change within a cell for synchronous reconfiguration.

Base stations that operate according to fifth-generation (5G) New Radio (NR) requirements support significantly larger bandwidth than fourth-generation (4G) base stations. Accordingly, the Third Generation Partnership Project (3GPP) has proposed that for Release 15, user equipment units (UEs) support a 100 MHz bandwidth in frequency range 1 (FR1) and a 400 MHz bandwidth in frequency range (FR2). Due to the relatively wide bandwidth of a typical carrier, 3GPP has proposed that for Release 17, a 5G NR base station can provide multicast and/or broadcast services (MBS) to UEs that can be useful in many content delivery applications, such as transparent IPv4/IPv6 multicast delivery, IPTV, software delivery over wireless, group communications, IoT applications, V2X applications, and emergency messages related to public safety.

However, in some cases, it is not clear how a UE and a base station should configure and manage flows of MBS packets.

SUMMARY

A RAN and/or a UE implement the techniques of this disclosure for managing transmission and reception of MBS.

A UE can perform a session establishment procedure (e.g., a PDU session establishment procedure) with a core network (CN) via a base station of the RAN. The base station can use a DRB associated with the session to transmit the MBS data packets to the UE. The DRB can be a unicast DRB (i.e., a dedicated DRB allocated to the UE) or a multicast DRB (also referred to herein as an "MRB").

During the session establishment procedure, the base station can send configuration parameters to the UE configuring a first DRB associated with the session. The UE can use this first DRB to transmit an MBS request for an MBS service to the base station. Alternatively, the UE can transmit an MBS request via an SRB, or the base station can receive a request from the CN to transmit an MBS service to the UE. In response to the MBS request, the base station can transmit MBS data packets for the MBS service via the first DRB, or the base station can configure a second DRB associated with the session and can transmit the MBS data packets to the UE via the second DRB.

In some implementations, the base station can use the first or second DRB associated with the session to transmit unicast data packets associated with a unicast service to the UE. Further, in some implementations, the CN can establish multiple PDU sessions for multiple UEs via the base station, respectively. The base station can configure one or more DRBs for the PDU sessions. In some cases, the base station can transmit the same configuration parameters to a first subset of UEs and transmit MBS data packets to the UEs in accordance with the configuration parameters (i.e., the configuration parameters can be for a shared, multicast DRB). For a second subset of UEs, the base station can transmit unicast configuration parameters to each respective UE (i.e., the configuration parameters can be for respective unicast DRBs).

One example embodiment of these techniques is a method implemented in a base station for managing communication of MBS. The method can be executed by processing hardware and includes causing establishment of a session for transmitting MBS data packets from a CN to a UE. The method also includes transmitting configuration parameters associated with the session to the UE. Further, the method includes transmitting MBS data packets to the UE in accordance with the configuration parameters.

Another example embodiment of these techniques is a base station including processing hardware and configured to implement the method above.

A further example embodiment of these techniques is a method implemented in a UE for managing reception of MBS. The method can be executed by processing hardware and includes establishing a session for receiving MBS data packets from a CN via a base station. The method also includes receiving configuration parameters associated with the session and receiving MBS data packets in accordance with the configuration parameters from the base station.

Yet another example embodiment of these techniques is a UE including processing hardware and configured to implement the method above.

DETAILED DESCRIPTION OF THE DRAWINGS

Generally speaking, the techniques of this disclosure allow UEs to receive MBS information via radio resources allocated by a base station of a RAN. To this end, the base station can configure different radio resources in one or multiple overlapping cells to multicast or broadcast ("multicast" or "broadcast" interchangeably referred to as "transmit") MBS data (and associated control information) and/or unicast ("unicast" interchangeably referred to as "transmit") non-MBS data (and associated control information) with one or multiple UEs on the downlink (DL). The base station can also unicast MBS data (and associated control information) to a UE on a dedicated DRB for the UE. The one or more multiple UEs can transmit (i.e., unicast) non-MBS data to the base station on the uplink (UL).

Accordingly, a base station of this disclosure can configure one or more radio bearers to transmit MBS information (i.e., MBS data packets and/or control information) to a UE. A radio bearer that carries MBS information to the UE can be a unicast DRB (i.e., a dedicated DRB for the UE) or a multicast DRB (i.e., a DRB that may be shared by multiple UEs, also referred to as an MBS radio bearer or MRB). For example, the base station can transmit unicast configuration parameters or multicast configuration parameters to the UE to configure the UE to receive MBS information via a unicast DRB or a multicast DRB, respectively. As used in this disclosure, the term DRB may refer to a unicast DRB or a multicast DRB, unless specifically noted otherwise.

Figure 1A:
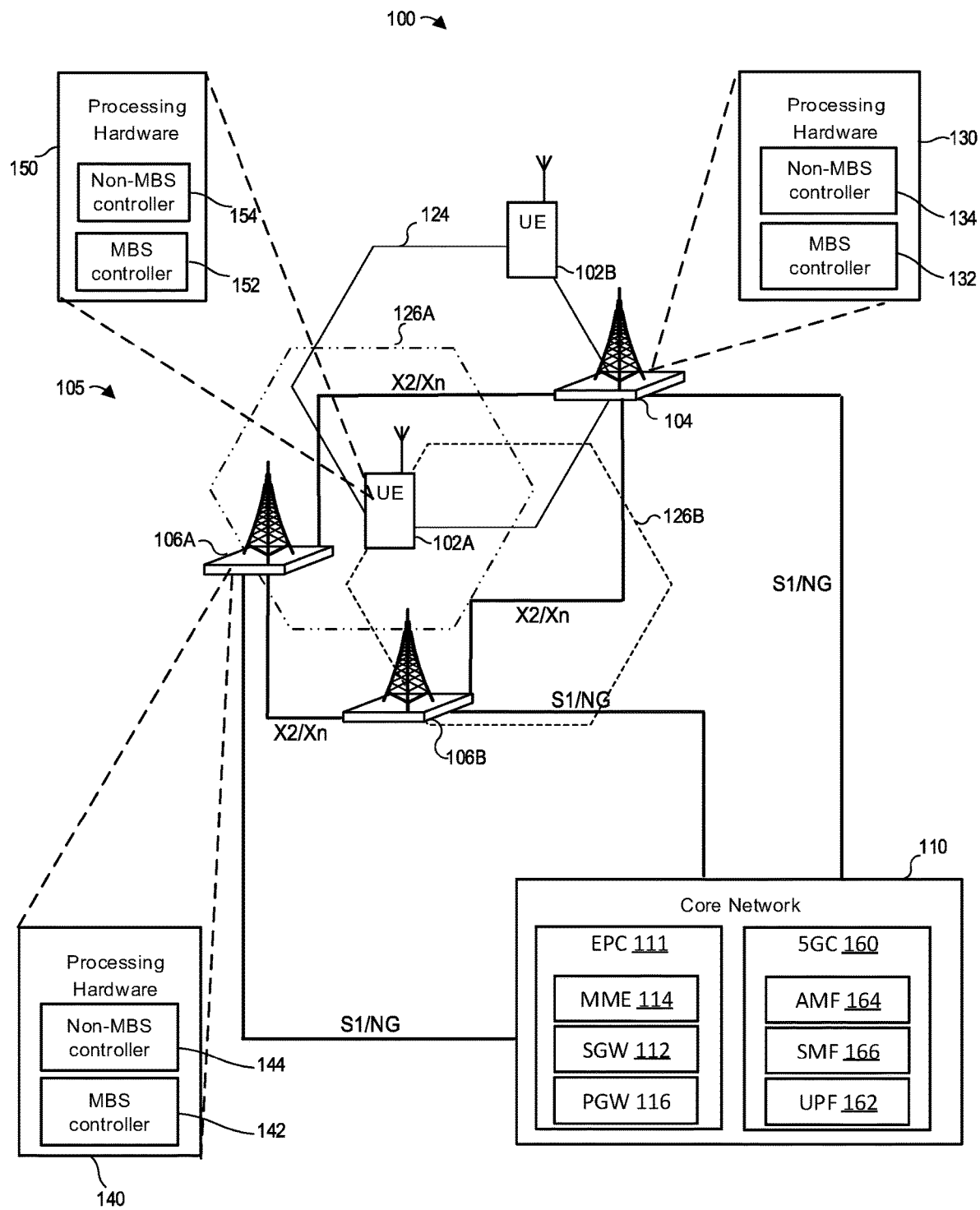
FIG. 1A is a block diagram of an example system in which a RAN and/or a UE implement the techniques of this disclosure for managing transmission and reception of MBS.

FIG. 1A depicts an example wireless communication system 100 that can implement MBS operation techniques of this disclosure. The wireless communication system 100 includes UE 102A and UE 102B, as well as base stations 104, 106A, 106B of a radio access network (RAN) (e.g., RAN 105) that are connected to a core network (CN) 110. To ease readability, UE 102 is used herein to represent the UE 102A, the UE 102B, or both the UE 102A and UE 102B, unless otherwise specified. The base stations 104, 106A, 106B can be any suitable type, or types, of base stations, such as an evolved node B (eNB), a next-generation eNB (ng-eNB), or a 5G Node B (gNB), for example. As a more specific example, the base station 104 can be an eNB or a gNB, and the base stations 106A and 106B can be gNBs.

The base station 104 supports a cell 124, the base station 106A supports a cell 126A, and the base station 106B supports a cell 126B. The cell 124 partially overlaps with both of cells 126A and 126B, such that the UE 102 can be in range to communicate with base station 104 while simultaneously being in range to communicate with base station 106A or 106B (or in range to detect or measure the signal from both base stations 106A and 106B). The overlap can make it possible for the UE 102 to hand over between cells (e.g., from cell 124 to cell 126A or 126B) or base stations (e.g., from base station 104 to base station 106A or base station 106B) before the UE 102 experiences radio link failure, for example. Moreover, the overlap allows the various dual connectivity (DC) scenarios discussed below. For example, the UE 102 can communicate in DC with the base station 104 (operating as an MN) and the base station 106A (operating as an SN) and, upon completing a handover to base station 106B, can communicate with the base station 106B (operating as an MN). As another example, the UE 102 can communicate in DC with the base station 104 (operating as an MN) and the base station 106A (operating as an SN) and, upon completing an SN change, can communicate with the base station 104 (operating as an MN) and the base station 106B (operating as an SN).

More particularly, when the UE 102 is in DC with the base station 104 and the base station 106A, the base station 104 operates as a master eNB (MeNB), a master ng-eNB (Mng-eNB), or a master gNB (MgNB), and the base station 106A operates as a secondary gNB (SgNB) or a secondary ng-eNB (Sng-eNB).

In non-MBS (i.e., unicast) operation, the UE 102 can use a radio bearer (e.g., a DRB or an SRB) that at different times terminates at an MN (e.g., the base station 104) or an SN (e.g., the base station 106A). For example, after handover or SN change to the base station 106B, the UE 102 can use a radio bearer (e.g., a DRB or an SRB) that at different times terminates at the base station 106B. The UE 102 can apply one or more security keys when communicating on the radio bearer, in the UL (from the UE 102 to a base station) and/or DL (from a base station to the UE 102) direction. In the non-MBS operation, the UE 102 transmits data via the radio bearer on (i.e., within) an uplink BWP of a cell to the base station and/or receives data via the radio bearer on a DL BWP of the cell from the base station. The UL BWP can be an initial UL BWP or a dedicated UL BWP, and the DL BWP can be an initial DL BWP or a dedicated DL BWP. The UE 102 can receive paging, system information, public warning message(s), or a random access response on the DL BWP. In such non-MBS operation, the UE 102 can be in a connected state. Alternatively, the UE 102 can be in an idle or inactive state if the UE 102 supports small data transmission in the idle or inactive state.

In MBS operation, the UE 102 can use a radio bearer (e.g., a DRB or an MRB) that at different times terminates at an MN (e.g., the base station 104) or an SN (e.g., the base station 106A). For example, after handover or SN change to the base station 106B, the UE 102 can use a radio bearer (e.g., a DRB or an MRB) that at different times terminates at the base station 106B which can be an MN or SN. The base station can utilize the radio bearer to transmit application-level messages, such as security keys, to the UE 102. In some implementations, the base station (e.g., the MN or SN) can transmit MBS data over dedicated radio resources (i.e., the radio resources dedicated to the UE 102) to the UE 102 (e.g., via the DRB or MRB). In such implementations, the base station can apply one or more security keys to protect integrity of MBS data and/or encrypt MBS data and transmits the encrypted and/or integrity protected MBS data over the dedicated radio resources to the UE 102. Correspondingly, the UE 102 can apply the one or more security keys to decrypt MBS data and/or check integrity of the MBS data when receiving the MBS data on the radio bearer, in the downlink (from a base station to the UE 102) direction. In other implementations, the base station (e.g., the MN or SN) can transmit MBS data over common radio resources (i.e., the radio resources common to the UE 102 and other UE(s)) or a DL BWP of a cell from the base station to the UE 102 (e.g., via the DRB or MRB). The DL BWP can be an initial DL BWP, a dedicated DL BWP, or an MBS DL BWP (i.e., a DL BWP specific for MBS or not for unicast). In such implementations, the base station can refrain from applying a security key to MBS data and transmit the MBS data on the radio bearer. Correspondingly, the UE 102 can omit applying a security key to MBS data received on the radio bearer. The UE 102 can apply an application-level security key, received from the CN 110 or an MBS server, to MBS data received on the radio bearer.

The base station 104 includes processing hardware 130, which can include one or more general-purpose processors (e.g., central processing units (CPUs)) and a computer-readable memory storing machine-readable instructions executable on the one or more general-purpose processor(s), and/or special-purpose processing units. The processing hardware 130 in the example implementation of FIG. 1A includes a base station MBS controller 132 that is configured to manage or control transmission of MBS information received from the CN 110 or an edge server. For example, the base station MBS controller 132 can be configured to support Radio Resource Control (RRC) configurations, procedures and messaging associated with MBS procedures, and/or to support the necessary operations, as discussed below. The processing hardware 130 can include a base station non-MBS controller 134 configured to manage or control one or more RRC configurations and/or RRC procedures when the base station 104 operates as an MN or SN during a non-MBS operation.

The base station 106A includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation of FIG. 1A includes a base station MBS controller 142 that is configured to manage or control transmission of MBS information received from the CN 110 or an edge server. For example, the base station MBS controller 142 can be configured to support RRC configurations, procedures and messaging associated with MBS procedures, and/or to support the necessary operations, as discussed below. The processing hardware 140 can include a base station non-MBS controller 144 configured to manage or control one or more RRC configurations and/or RRC procedures when the base station 106A operates as an MN or SN during a non-MBS operation. While not shown in FIG. 1A, the base station 106B can include processing hardware similar to the processing hardware 130 of the base station 104 or the processing hardware 140 of the base station 106A.

The UE 102 includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes a UE MBS controller 152 that is configured to manage or control reception of MBS information. For example, the UE MBS controller 152 can be configured to support RRC configurations, procedures and messaging associated with MBS procedures, and/or to support the necessary operations, as discussed below. The processing hardware 150 can include a UE non-MBS controller 154 configured to manage or control one or more RRC configurations and/or RRC procedures in accordance with any of the implementations discussed below, when the UE 102 communicates with an MN and/or an SN during a non-MBS operation.

The CN 110 can be an evolved packet core (EPC) 111 or a fifth-generation core (5GC) 160, both of which are depicted in FIG. 1A. The base station 104 can be an eNB supporting an S1 interface for communicating with the EPC 111, an ng-eNB supporting an NG interface for communicating with the 5GC 160, or a gNB that supports an NR radio interface as well as an NG interface for communicating with the 5GC 160. The base station 106A can be an EUTRA-NR DC (EN-DC) gNB (en-gNB) with an S1 interface to the EPC 111, an en-gNB that does not connect to the EPC 111, a gNB that supports the NR radio interface and an NG interface to the 5GC 160, or a ng-eNB that supports an EUTRA radio interface and an NG interface to the 5GC 160. To directly exchange messages with each other during the scenarios discussed below, the base stations 104, 106A, and 106B can support an X2 or Xn interface.

Among other components, the EPC 111 can include a Serving Gateway (SGW) 112, a Mobility Management Entity (MME) 114, and a Packet Data Network Gateway (PGW) 116. The SGW 112 is generally configured to transfer user-plane packets related to audio calls, video calls, Internet traffic, etc., and the MME 114 is configured to manage authentication, registration, paging, and other related functions. The PGW 116 provides connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management (AMF) 164, and/or Session Management Function (SMF) 166. The UPF 162 is generally configured to transfer user-plane packets related to audio calls, video calls, Internet traffic, etc., the AMF 164 is configured to manage authentication, registration, paging, and other related functions, and the SMF 166 is configured to manage PDU sessions. The UPF 162, AMF 164 and/or the SMF 166 can be configured to support MBS. For example, the SMF 166 can be configured to manage or control MBS transport, configure the UPF 162 and/or RAN 105 for MBS flows, and/or manage or configure MBS session(s) or PDU Session(s) for MBS for UE 102. The UPF 162 is configured to transfer MBS data packets to audio, video, Internet traffic, etc. to the RAN 105. The UPF 162 and/or SMF 166 can be configured for both unicast service and MBS, or for MBS only.

Generally, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure can also apply to other suitable radio access and/or core network technologies such as sixth generation (6G) radio access and/or 6G core network or 5G NR-6G DC, for example.

In different configurations or scenarios of the wireless communication system 100, the base station 104 can operate as an MeNB, an Mng-eNB, or an MgNB, the base station 106B can operate as an MeNB, an Mng-eNB, an MgNB, an SgNB, or an Sng-eNB, and the base station 106A can operate as an SgNB or an Sng-eNB. The UE 102 can communicate with the base station 104 and the base station 106A or 106B via the same radio access technology (RAT), such as EUTRA or NR, or via different RATs.

When the base station 104 is an MeNB and the base station 106A is an SgNB, the UE 102 can be in EN-DC with the MeNB 104 and the SgNB 106A. When the base station 104 is an Mng-eNB and the base station 106A is an SgNB, the UE 102 can be in next generation (NG) EUTRA-NR DC (NGEN-DC) with the Mng-eNB 104 and the SgNB 106A. When the base station 104 is an MgNB and the base station 106A is an SgNB, the UE 102 can be in NR-NR DC (NR-DC) with the MgNB 104 and the SgNB 106A. When the base station 104 is an MgNB and the base station 106A is an Sng-eNB, the UE 102 can be in NR-EUTRA DC (NE-DC) with the MgNB 104 and the Sng-eNB 106A.

Figure 1B:
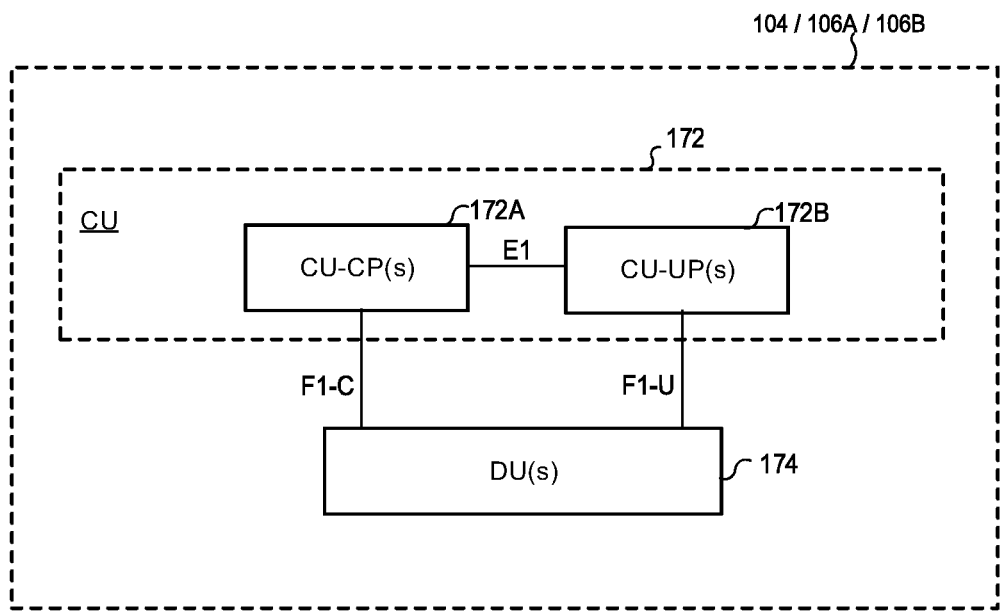
FIG. 1B is a block diagram of an example base station in which a central unit (CU) and a distributed unit (DU) can operate in the system of FIG. 1A.

FIG. 1B depicts an example, distributed implementation of any one or more of the base stations 104, 106A, 106B. In this implementation, the base station 104, 106A, or 106B includes a central unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include the processing hardware 130 or 140 of FIG. 1A.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as an MN or an SN. The processing hardware can also include a physical layer controller configured to manage or control one or more physical layer operations or procedures.

In some implementations, the CU 172 can include a logical node CU-CP 172A that hosts the control plane part of the Packet Data Convergence Protocol (PDCP) protocol of the CU 172 and/or radio resource control (RRC) protocol of the CU 172. The CU 172 can also include logical node(s) CU-UP 172B that hosts the user plane part of the PDCP protocol and/or Service Data Adaptation Protocol (SDAP) protocol of the CU 172. The CU-CP 172A can transmit the non-MBS control information and MBS control information, and the CU-UP 172B can transmit the non-MBS data packets and MBS data packets, as described herein.

The CU-CP 172A can be connected to multiple CU-UP 172B through the E1 interface. The CU-CP 172A selects the appropriate CU-UP 172B for the requested services for the UE 102. In some implementations, a single CU-UP 172B can be connected to multiple CU-CP 172A through the E1 interface. The CU-CP 172A can be connected to one or more DU 174s through an F1-C interface. The CU-UP 172B can be connected to one or more DU 174 through the F1-U interface under the control of the same CU-CP 172A. In some implementations, one DU 174 can be connected to multiple CU-UP 172B under the control of the same CU-CP 172A. In such implementations, the connectivity between a CU-UP 172B and a DU 174 is established by the CU-CP 172A using Bearer Context Management functions.

Figure 2:
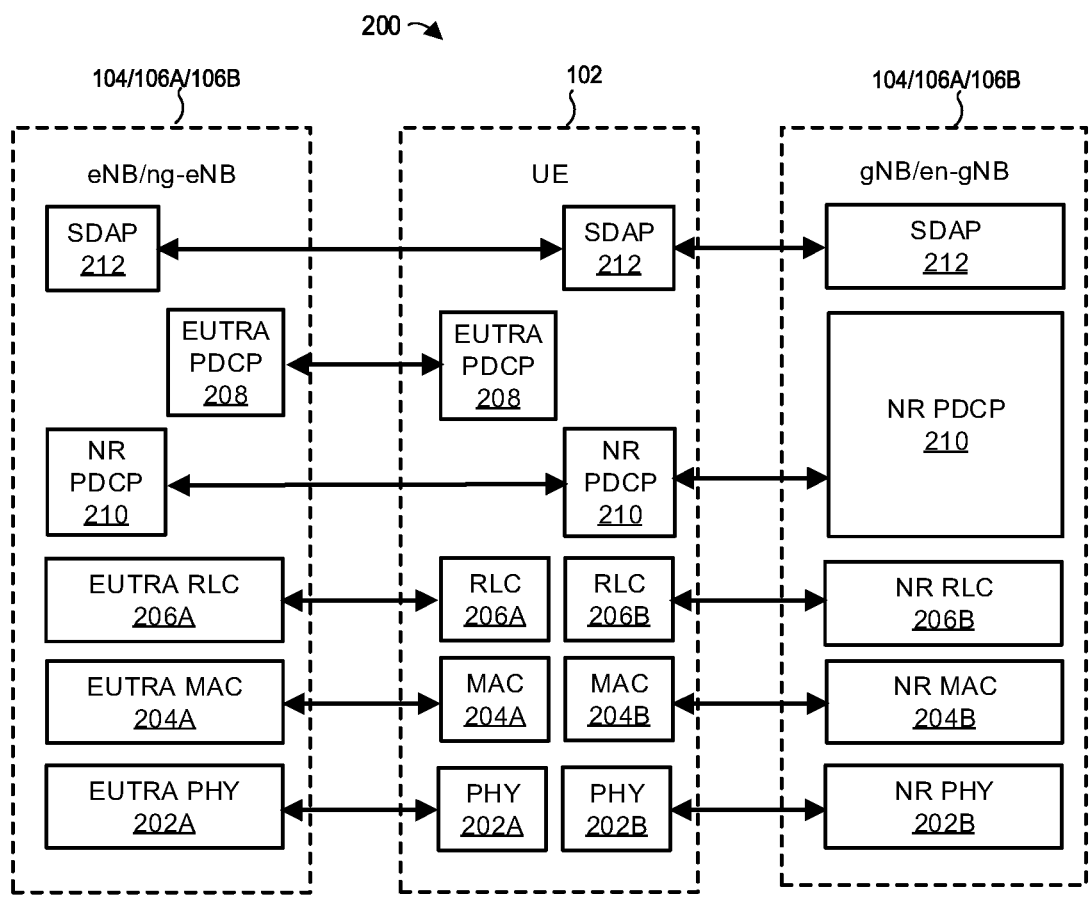
FIG. 2 is a block diagram of an example protocol stack according to which the UE of FIG. 1A can communicate with base stations of FIG. 1A.

FIG. 2 illustrates, in a simplified manner, an example protocol stack 200 according to which the UE 102 can communicate with an eNB/ng-eNB or a gNB (e.g., one or more of the base stations 104, 106A, 106B).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A, and an SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets". The packets can be MBS packets or non-MBS packets. For example, the MBS packets include MBS data packets including application content for an MBS service (e.g., IPv4/IPv6 multicast delivery, IPTV, software delivery over wireless, group communications, IoT applications, V2X applications, and/or emergency messages related to public safety). In another example, the MBS packets include application control information for the MBS service.

On a control plane, the EUTRA PDCP sublayer 208 and the NR PDCP sublayer 210 can provide SRBs to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 can be SDAP PDUs, Internet Protocol (IP) packets or Ethernet packets.

In scenarios where the UE 102 operates in EN-DC with the base station 104 operating as an MeNB and the base station 106A operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer, a split bearer, or an MN-terminated SCG bearer. The SN-terminated bearer can be an SCG bearer, a split bearer, or an SN-terminated MCG bearer. The MN-terminated bearer can be an SRB (e.g., SRB1 or SRB2) or a DRB. The SN-terminated bearer can be an SRB or a DRB.

In some implementations, a base station (e.g., base station 104, 106A or 106B) broadcasts MBS data packets via one or more MBS radio bearers (MRB(s)), and in turn the UE 102 receives the MBS data packets via the MRB(s). The base station can include configuration(s) of the MRB(s) in multicast configuration parameters (which can also be referred to as MBS configuration parameters) described below. In some implementations, the base station broadcasts the MBS data packets via RLC sublayer 206, MAC sublayer 204, and PHY sublayer 202, and correspondingly, the UE 102 uses PHY sublayer 202, MAC sublayer 204, and RLC sublayer 206 to receive the MBS data packets. In such implementations, the base station and the UE 102 may not use PDCP sublayer 208 and a SDAP sublayer 212 to communicate the MBS data packets. In other implementations, the base station transmits the MBS data packets via PDCP sublayer 208, RLC sublayer 206, MAC sublayer 204, and PHY sublayer 202, and correspondingly, the UE 102 uses PHY sublayer 202, MAC sublayer 204, RLC sublayer 206 and PDCP sublayer 208 to receive the MBS data packets. In such implementations, the base station and the UE 102 may not use a SDAP sublayer 212 to communicate the MBS data packets. In yet other implementations, the base station transmits the MBS data packets via the SDAP sublayer 212, PDCP sublayer 208, RLC sublayer 206, MAC sublayer 204 and PHY sublayer 202, and correspondingly, the UE 102 uses PHY sublayer 202, MAC sublayer 204, RLC sublayer 206, PDCP sublayer 208, and the SDAP sublayer 212 to receive the MBS data packets.

FIGS. 3A-5 are messaging diagrams of example scenarios in which a base station, CN, and UE communicate MBS information. Generally speaking, events in FIGS. 3A-5 that are similar are labeled with similar reference numbers (e.g., event 350A is similar to event 350B, 350C, 450A, etc.), with differences discussed below where appropriate. With the exception of the differences shown in the figures and discussed below, any of the alternative implementations discussed with respect to a particular event (e.g., for messaging and processing) may apply to events labeled with similar reference numbers in other figures.

Figure 3A:
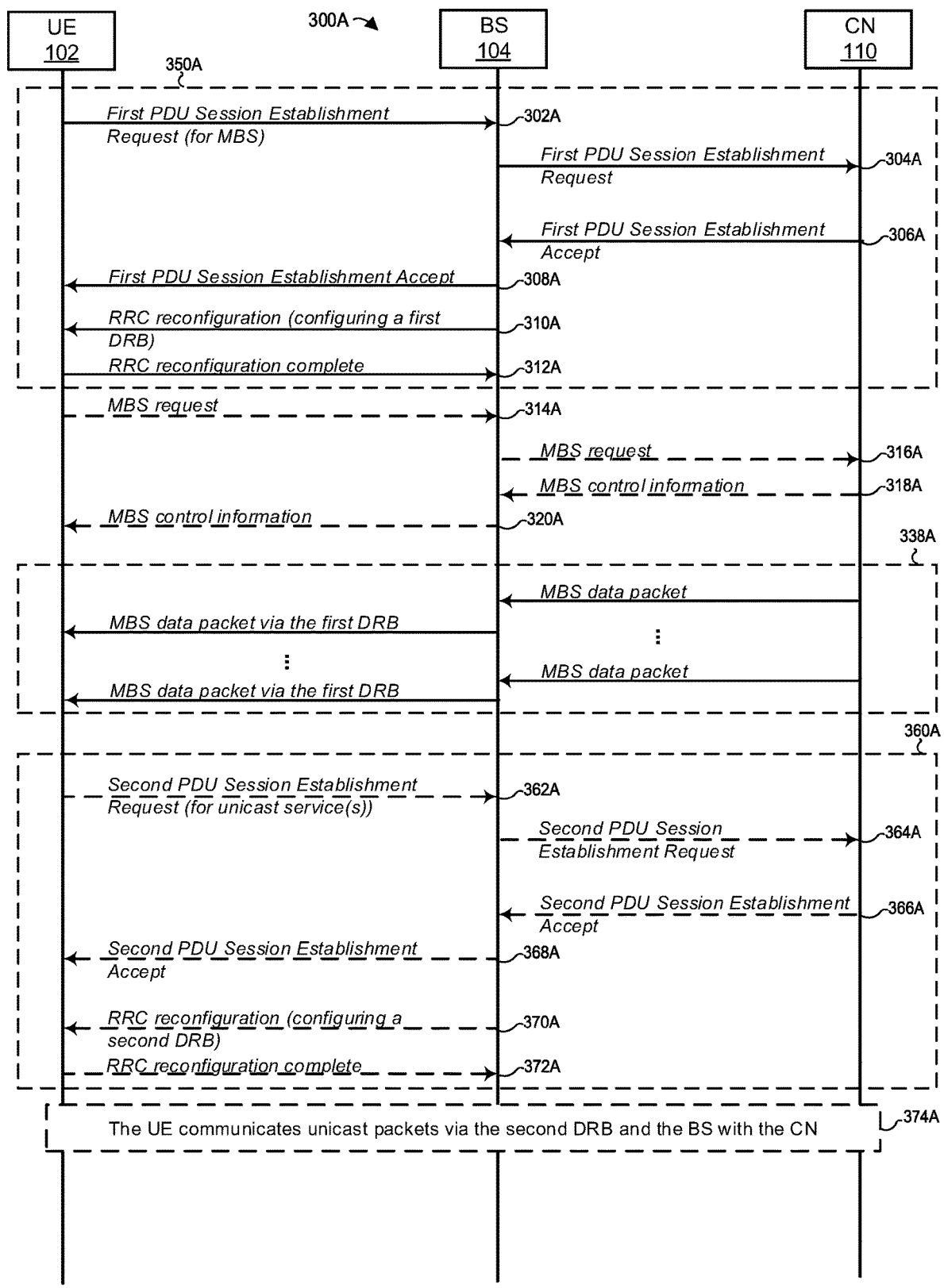
FIG. 3A is a messaging diagram of an example scenario in which a base station establishes a PDU session between a core network (CN) and a UE and transmits MBS data packets to the UE via a data radio bearer (DRB) configured during the PDU session establishment procedure.

Now referring to a scenario 300A illustrated in FIG. 3A, the UE 102 initially transmits 302A a first PDU Session Establishment Request message for establishing a first PDU Session for MBS to the base station (BS) 104. To indicate that the UE 102 is requesting a DRB for receiving MBS information, the UE 102 may include a flag or other indication in the PDU Session Establishment Request. For example, the flag may be a data network name (DNN) field set to "MBS" or corresponding to an MBS service. In some implementations, the UE 102 initially operates in an idle state or an inactive state (e.g., RRC_IDLE state, RRC_INACTIVE state), or more generally in a state in which there is no active radio connection between the UE 102 and the base station 104. Alternatively, the UE 102 initially operates in a connected state (e.g., RRC_CONNECTED state), or more generally in a state in which there is an active radio connection between the UE 102 and the base station 104.

The base station 104 in turn sends 304A the first PDU Session Establishment Request message to the CN 110 (e.g., AMF 164 and/or SMF 166). In some implementations, the base station 104 can send 304A a BS to CN interface message (e.g., NG interface message, INITIAL UE MESSAGE, or UPLINK NAS TRANSPORT message) including the first PDU Session Establishment Request message to the CN 110.

In response to the first PDU Session Establishment Request message, the CN 110 sends 306A a first PDU Session Establishment Accept message to the base station 104, which in turn sends 308A the first PDU Session Establishment Accept message to the UE 102. In some implementations, the CN 110 sends 306A a CN to BS interface message (e.g., NG interface message or PDU SESSION RESOURCE SETUP REQUEST message) including the first PDU Session Establishment Accept message. In response to the CN to BS interface message, the base station 104 transmits 310A an RRC reconfiguration message configuring a first DRB to the UE 102. In some implementations, the base station 104 can include the first PDU Session Establishment Accept message in the RRC reconfiguration message that the base station 104 transmits 310A. In other implementations, the base station 104 can transmit 308A a DL RRC message including the first PDU Session Establishment Accept message to the UE 102. The DL RRC message can be a DLInformationTransfer message, an RRC reconfiguration message, or any suitable RRC message which can include a NAS PDU.

In response to the RRC reconfiguration message that the base station 104 transmits 310A, the UE 102 can transmit 312A an RRC reconfiguration complete message to the base station 104. In some implementations, after receiving 312A the RRC reconfiguration complete message, the base station 104 sends a BS to CN interface message (e.g., PDU SESSION RESOURCE SETUP RESPONSE message) to the CN 110 to confirm that the base station 104 has configured radio resources for the UE 102 for the first PDU Session.

Events 302A, 304A, 306A, 308A, 310A and 312A are collectively referred to as an MBS PDU session establishment procedure 350A.

In some implementations, the UE 102 can transmit 314A to the base station 104 an MBS request message to request, join, or register a particular MBS service, and the base station 104 can send 316A the MBS request message to the CN 110. In one implementation, the UE 102 can include the MBS request message in an IP packet and transmit the IP packet to the base station 104 via the first DRB. In such implementation, the base station 104 sends 316A the IP packet to the CN 110 (e.g., UPF 162). In another implementation, UE 102 can transmit 314A the MBS request via an SRB (e.g., as a NAS message or an RRC message). For example, UE 102 can transmit a NAS message requesting an MBS service to the base station 104 via an SRB, and the base station 104 in turn sends 316A the NAS message to the CN 110 (e.g., AMF 164 and/or SMF 166). In other implementations, the UE 102 can refrain from sending an explicit MBS request to the base station 104. For example, the PDU Session Establishment Request message (event 302A) may indicate an MBS service that the UE 102 is interested in receiving. In yet other implementations, the CN 110 can transmit a message to the base station 104 requesting that the base station 104 transmit an MBS service to the UE 102 (e.g., an emergency broadcast).

After the CN 110 determines that the base station 104 has configured radio resources for the UE 102 for the first PDU Session, the CN 110 in some implementations can send 318A MBS control information to the base station 104, which in turn transmits 320A the MBS control information to the UE 102, e.g. via an SRB or the first DRB. In particular, in some implementations, a network node (e.g., the CN 110 or an MBS server) generates the MBS control information. In one implementation, the network node can include the MBS control information in IP packet(s) and send 318A the IP packet(s) to the base station 104, which in turn transmits 320A the IP packet(s) to the UE 102 via the first DRB. In another implementation, the CN 110 sends 318A NAS message(s) including the MBS control information to the base station 104. The base station 104 in turn sends 320A the NAS message(s) to the UE 102 via an SRB. In some implementations, the CN 110 and/or base station 104 may transmit to the UE 102 the MBS control information on a first quality of service (QoS) flow, i.e., the CN 110 associates the MBS control information to a first QoS profile of the first QoS flow including a first plurality of QoS parameters. The CN 110 and the base station 104 enforce the first QoS profile on transmissions of the MBS data packets.

Alternatively, in other implementations, the base station 104 generates the MBS control information instead of receiving the MBS control information from the CN 110 or an MBS server. The base station 104 transmits 320A the MBS control information to the UE 102, e.g. via an SRB or the first DRB.

The MBS control information helps the UE 102 to receive 338A MBS data packets. In some implementations, the CN 110 can determine that the UE 102 has been configured radio resources for the first PDU Session in response to the PDU SESSION RESOURCE SETUP RESPONSE message or the MBS request message. After the CN 110 determines that the UE 102 has been configured radio resources for the first PDU Session, the CN 110 in some implementations sends 338A MBS data packets of the particular MBS service to the base station 104, which in turn transmits the MBS data packets to the UE 102 via the first DRB. In cases involving a group of UEs, the CN 110 in other implementations can send 338A MBS data packets of the particular MBS service to the base station 104 irrespective of whether the UE 102 has been configured radio resources for the first PDU Session.

In some implementations, the CN 110 and/or base station 104 may transmit to the UE 102 the MBS data packets on a second quality of service (QoS) flow, i.e., the CN 110 associates the MBS data packets to a second QoS profile of the second QoS flow including a second plurality of QoS parameters. The CN 110 and the base station 104 enforce the second QoS profile on transmissions of the MBS data packets. In other implementations, the CN 110 may send the MBS data packets on the first QoS flow. The CN 110 and the base station 104 enforce the first QoS profile on transmissions of the MBS data packets.

In some implementations, the MBS control information includes security configuration parameters. In one implementation, the security configuration parameters include security key(s) and the UE 102 uses the security key(s) to decrypt and/or integrity check the MBS data packets. In another implementation, the UE 102 derives security key(s) from the security configuration parameters and uses the security key(s) to decrypt and/or integrity check the MBS data packets.

In other implementations, the MBS control information includes a group identity (e.g., Temporary Mobile Group Identity (TMGI)) or an MBS session identity. The UE 102 uses the group identity and/or MBS session identity to receive the MBS data packets.

In some implementations, the RRC reconfiguration message that the base station 104 transmits 310A includes a first DRB configuration configuring the first DRB and includes physical layer configuration parameters, MAC configuration parameters, and/or RLC configuration parameters. The base station 104 can assign radio resources for transmission of the MBS data packets to a particular UE (e.g., the UE 102A) or a group of UEs (e.g., the UE 102A and the UE 102B, or the UE 102A, the UE 102B, and/or other UE(s) not shown in FIG. 1A and FIG. 3A). In case of the group of UEs, the base station 104 sends 338A the MBS data packets on radio resources (i.e., radio resources common for the group of UEs) where the group of UEs receives the MBS data packets using the configuration parameters. Thus, each UE in the group of UEs receives 338A the MBS data packets on the same radio resources from the base station 104. Accordingly, the RRC reconfiguration message that the base station 104 transmits 310A or the first DRB configuration may include unicast configuration parameters for a particular UE or multicast configuration parameters for a group of UEs.

In cases involving the group of UEs, in some implementations, the base station 104 can transmit the first DRB configuration and the configuration parameters to the group of UEs in separate RRC reconfiguration messages. In other implementations, the base station 104 can broadcast the first DRB configuration and/or the configuration parameters to the group of UEs (e.g., the base station 104 can broadcast the first DRB configuration and/or the configuration parameters in system information block(s) (SIB) to the cell 124). The configuration parameters for the UE 102 to receive MBS data packets on the common radio resources may include a radio network temporary identifier (RNTI). The group of the UEs or the UE 102 uses the RNTI to receive, on a PDCCH, a DCI with a CRC scrambled with the RNTI and receives a PDSCH in accordance with the DCI. The PDSCH can include a partial MBS data packet and/or at least one MBS data packet. In some implementations, the RNTI can be a group RNTI (G-RNTI) or an MBS-RNTI. In some implementations, the configuration parameters, e.g., for the UE 102 to receive MBS data packets on the common radio resources, may include a DL BWP configuration configuring an MBS DL BWP.

In cases involving a particular UE, the base station 104 sends 338A the MBS data packets on dedicated radio resources (i.e., dedicated only to the particular UE) where the particular UE receives the MBS packets using the configuration parameters. Thus, the particular UE receive 338A the MBS data packets on the dedicated radio resources from the base station 104.

In some implementations, the RRC reconfiguration message that the base station 104 transmits 310A can include a CellGroupConfig information element (IE) configuring the configuration parameters. In other implementations, the RRC reconfiguration message that the base station 104 transmits 310A can include an MBS specific IE configuring the configuration parameters. The base station 104 can indicate that the first DRB is associated with the first PDU Session in the RRC reconfiguration message that the base station 104 transmits 310A. For example, the first DRB configuration can include a PDU session identity of the first PDU Session. In some implementations, the base station configures the UE 102 to use an RLC acknowledged mode (AM) for the first DRB in the RLC configuration parameters. In other implementations, the base station configures the UE 102 to use an RLC unacknowledged mode (UM) for the first DRB in the RLC configuration parameters.

Before, during or after the MBS PDU session establishment procedure 350A, the UE 102 in some implementations can perform a unicast PDU session establishment procedure 360A with the base station 104 and the CN 110 (e.g., AMF 164 and/or SMF 166 or another AMF and/or SMF). The UE 102 transmits 362A a second PDU Session Establishment Request message for establishing a second PDU Session for one or more unicast services to the base station 104. For example, the one or more unicast services can be a voice call, video call, or internet service (e.g., a service for email, navigation, social media, streaming, gaming, web browsing, etc.)

The base station 104 in turn sends 364A the second PDU Session Establishment Request message to the CN 110 (e.g., AMF 164 and/or SMF 166). In some implementations, the base station 104 can send 364A a BS to CN interface message (e.g., NG interface message, INITIAL UE MESSAGE or UPLINK NAS TRANSPORT message) including the second PDU Session Establishment Request message to the CN 110.

In response to the second PDU Session Establishment Request message, the CN 110 sends 366A a second PDU Session Establishment Accept message to the base station 104, which in turn sends 368A the second PDU Session Establishment Accept message to the UE 102. In some implementations, the CN 110 sends 366A a CN to BS interface message (e.g., NG interface message or PDU SESSION RESOURCE SETUP REQUEST message) including the second PDU Session Establishment Accept message. In response to the CN to BS interface message, the base station 104 transmits 370A an RRC reconfiguration message configuring a second DRB to the UE 102. In some implementations, the base station 104 can include the second PDU Session Establishment Accept message in the RRC reconfiguration message that the base station 104 transmits 370A. In other implementations, the base station 104 can transmit 368A a DL RRC message including the second PDU Session Establishment Accept message to the UE 102. The DL RRC message can be a DLInformationTransfer message, an RRC reconfiguration message or any suitable RRC message which can include a NAS PDU.

In response to the RRC reconfiguration message that the UE 102 receives 370A, the UE 102 can transmit 372A an RRC reconfiguration complete message to the base station 104. In some implementations, after receiving 372A the RRC reconfiguration complete message, the base station 104 sends a BS to CN interface message (e.g., PDU SESSION RESOURCE SETUP RESPONSE message) to the CN 110 to confirm that the base station 104 has configured radio resources for the UE 102 for the second PDU Session.

In some implementations, the RRC reconfiguration message that the base station 104 transmits 370A includes a second DRB configuration configuring the second DRB and includes physical layer configuration parameters, MAC configuration parameters, and/or RLC configuration parameters configuring radio resources. The base station 104 can assign radio resources for unicast packets to a particular UE (e.g., the UE 102A), i.e., the radio resources can be dedicated only to the particular UE. The base station 104 transmits unicast packets on dedicated resources to the particular UE and the particular UE transmits unicast packets on dedicated resources to the base station 104.

In some implementations, the RRC reconfiguration message that the base station 104 transmits 370A can include a CellGroupConfig information element (IE) configuring the configuration parameters. The base station 104 can indicate that the second DRB is associated with the second PDU Session in the RRC reconfiguration message that the base station 104 transmits 370A. For example, the second DRB configuration can include a PDU session identity of the second PDU Session. In some implementations, the base station 104 configures the UE 102 to use an RLC AM for the second DRB in the RLC configuration parameters. In some implementations, the RLC configuration parameters in the RRC reconfiguration message that the base station 104 transmits 370A can be the same or different from the RLC configuration parameters in the RRC reconfiguration message that the base station 104 transmits 310A.

After configuring the second DRB, the UE 102 communicates 374A unicast packets with the CN 110 (e.g., UPF 162 or another UPF) via the second DRB and the base station 104. In some implementations, the unicast service(s) is/are IMS service(s) (e.g., voice service, supplementary service, and/or short message service) and the UE 102 establishes the second PDU Session for the IMS service(s). In such implementations, the UE 102 can transmit Session Initiation Protocol (SIP) messages via the second DRB to the base station 104, which in turn sends the SIP messages to the CN 110. Then, the CN 110 can send the SIP messages to an IMS network including e.g., a Proxy-Call Session Control Function (P-CSCF), a suitable network node processing the SIP messages, and/or a particular network node processing voice packets. In such implementations, the CN 110 can receive SIP messages from the IMS network and transmit the SIP messages to the base station 104, which in turn transmits the SIP messages to the UE 102 via the second DRB.

In some implementations, the UE 102 sends a SIP message (e.g., SIP INVITE) for a mobile originating voice call via the second DRB to the BS, which in turn sends the SIP message to the CN 110. Then the CN 110 sends the SIP message to the IMS network. In other implementations, the IMS network sends a SIP message (e.g., SIP INVITE) for a mobile terminating voice call for the UE 102. The IMS network can send an IMS to CN interface message (e.g., Npcf_PolicyAuthorization_Update message or a suitable Npcf message) to the CN 110 for the mobile originating or terminating voice call (e.g., in response to the SIP message received from the UE 102 or transmitted by the IMS network). In response to the IMS to CN interface message, the CN 110 sends to the base station 104 a CN to BS interface message (e.g., PDU Session Resource Modify Request message) causing the base station 104 to configure the UE 102 a DRB for communicating (e.g., transmitting and/or receiving) voice packets. In response to the CN to BS interface message, the base station 104 transmits to the UE 102 a third RRC reconfiguration message including a third DRB configuration configuring a third DRB. The UE 102 can transmit an RRC reconfiguration complete message to the base station 104 in response to the third RRC reconfiguration message. Thus, the UE 102 communicates voice packets with the CN 110 via the base station 104 (over the third DRB). The CN 110 can communicate the voice packets with the IMS network.

In some implementations, the CN 110 can include a PDU Session Modification Command message in the CN to BS interface message to configure a third quality of service (QoS) flow for transmission of voice packets to and/or from the UE 102. The CN 110 associates voice packets to a third QoS profile of the third QoS flow including a third plurality of QoS parameters. The CN 110 and the base station 104 enforce the third QoS profile on transmissions of the voice packets to and/or from the UE 102. Then the base station 104 transmits the PDU Session Modification Command message to the UE 102. In some implementations, the base station 104 can include the PDU Session Modification Command message in a DL RRC message and transmit the DL RRC message to the UE 102. For example, the DL RRC message can be the third RRC reconfiguration message, an additional RRC reconfiguration message, or a DLInformationTransfer message. The UE 102 can transmit an RRC reconfiguration complete message in response to the additional RRC reconfiguration message. Thus, the UE 102 can communicate voice packets on the QoS flow with the CN 110 via the base station 104 (over the third DRB).

In some implementations, the third RRC reconfiguration message includes physical layer configuration parameters, MAC configuration parameters, and/or RLC configuration parameters. The base station 104 can assign radio resources for voice packets to a particular UE (e.g., the UE 102A), i.e., the radio resources are dedicated only to the particular UE. The base station 104 transmits voice packets on dedicated resources to the particular UE and the particular UE transmits voice packets on dedicated resources to the base station 104.

In some implementations, the third RRC reconfiguration message can include a CellGroupConfig information element (IE) configuring the configuration parameters. In some implementations, the RLC configuration parameters in the third RRC reconfiguration message can be the same or different from the RLC configuration parameters in the RRC reconfiguration message that the base station 104 transmits 370A. In some implementations, the base station 104 configures the UE 102 to use an RLC UM for the third DRB in the RLC configuration parameters.

The base station 104 can indicate that the third DRB is associated with the second PDU Session and/or the QoS flow in the third RRC reconfiguration message. For example, the third DRB configuration can include a PDU session identity of the second PDU Session and/or a QoS flow identity of the third QoS flow.

The UE 102 can send a PDU Session Modification Complete message to the CN 110 via the base station 104 in response to the PDU Session Modification Command message. In some implementations, the UE 102 can include the PDU Session Modification Complete message in a UL RRC message and transmit the UL RRC message to the base station 104, which in turn extracts the PDU Session Modification Complete message from the UL RRC message and sends the PDU Session Modification Complete message to the CN 110. In some implementations, the base station 104 can send a BS to CN interface message (e.g., PDU Session Resource Modify Response message or Uplink NAS Transport message) including the PDU Session Modification Complete message to the CN 110. The base station 104 sends the PDU Session Resource Modify Response message in response to the PDU Session Resource Modify Request message. In some implementations, the UL RRC message can be the RRC reconfiguration complete message responding to the third RRC reconfiguration message or the additional RRC reconfiguration message. In other implementations, the UL RRC message can be a ULInformationTransfer message.

In some implementations, the unicast service(s) is/are Internet service(s) and the UE 102 establishes the second PDU Session for the Internet service(s). The UE communicates Internet Protocol (IP) packets with the CN 110 via the base station 104 (over the second DRB).

In some implementations, the UE 102 may include a first Data Network Name (DNN) in the first PDU Session Establishment Request message to indicate a particular data network that the UE 102 wishes to access via first PDU Session. In some implementations, the UE 102 may include a second DNN in the second PDU Session Establishment Request message to indicate a particular data network that the UE 102 wishes to access via the first PDU Session. In other implementations, the UE 102 may exclude a DNN in the second PDU Session Establishment Request message. In this case, the second PDU Session may be associated to a default DNN.

In some implementations, the UE 102 performs the first unicast PDU session establishment procedure 360A for the IMS service(s) as previously described. In such implementations, the UE 102 can perform a second unicast PDU session establishment procedure with the base station 104 and the CN 110 to establish a third PDU Session for the Internet service(s) similar to the first unicast PDU session establishment procedure 360A. In the second unicast PDU session establishment procedure, the base station 104 transmits to the UE 102 a fourth RRC reconfiguration message including a fourth DRB configuration configuring a fourth DRB, similar to event 370A. The UE 102 and base station 104 establish the fourth DRB with the fourth DRB configuration. The UE 102 can transmit a fourth RRC reconfiguration complete message to the base station 104 in response to the fourth RRC reconfiguration message. The UE 102 communicates IP packets of the Internet service(s) with the base station 104 (over the fourth DRB) and with the CN 110, similar to event 374A.

In some implementations, the fourth RRC reconfiguration message includes physical layer configuration parameters, MAC configuration parameters, and/or RLC configuration parameters. The base station 104 can assign the configuration parameters or radio resources to a particular UE (e.g., the UE 102A) or a group of UEs (e.g., the UE 102A and the UE 102B, or the UE 102A, the UE 102B, and/or other UE(s) not shown in FIG. 1A and FIG. 3B). In cases involving the group of UEs, the base station 104 sends the MBS data packets on radio resources (i.e., radio resources common for the group of UEs) where the group of UEs receive the MBS data packets using the configuration parameters. Thus, the group of UEs receive the MBS data packets on the same radio resources from the base station 104. In cases involving the group of UEs, the base station 104 can transmit the fourth DRB configuration and the configuration parameters to each UE in the group of UEs in separate RRC reconfiguration messages, or in a broadcast (e.g., a broadcast in SIB(s) to the cell 124). The configuration parameters for the UE 102 to receive MBS data packets on the common radio resources may include a radio network temporary identifier (RNTI). The group of the UEs or the UE 102 uses the RNTI to receive, on a PDCCH, a DCI with a CRC scrambled with the RNTI and receives a PDSCH in accordance with the DCI. The PDSCH can include a partial MBS data packet and/or at least one MBS data packet. In some implementations, the RNTI can be a group RNTI (G-RNTI) or an MBS-RNTI.

In cases involving a particular UE, the base station 104 sends the MBS data packets on dedicated radio resources (i.e., dedicated only to the particular UE) where the particular UE receives using the configuration parameters. Thus, the particular UE receives the MBS data packets on the dedicated radio resources from the base station 104.

In some implementations, the fourth RRC reconfiguration message can include a CellGroupConfig information element (IE) configuring the configuration parameters. The base station 104 can indicate that the fourth DRB is associated with the third PDU Session in the fourth RRC reconfiguration message. For example, the fourth DRB configuration can include a PDU session identity of the second PDU Session. In some implementations, the base station 104 configures the UE 102 to use an RLC AM for the fourth DRB in the RLC configuration parameters. In some implementations, the RLC configuration parameters in the fourth RRC reconfiguration message can be the same or different from the RLC configuration parameters in the RRC reconfiguration message that the base station 104 transmits 370A.

Figure 3B:
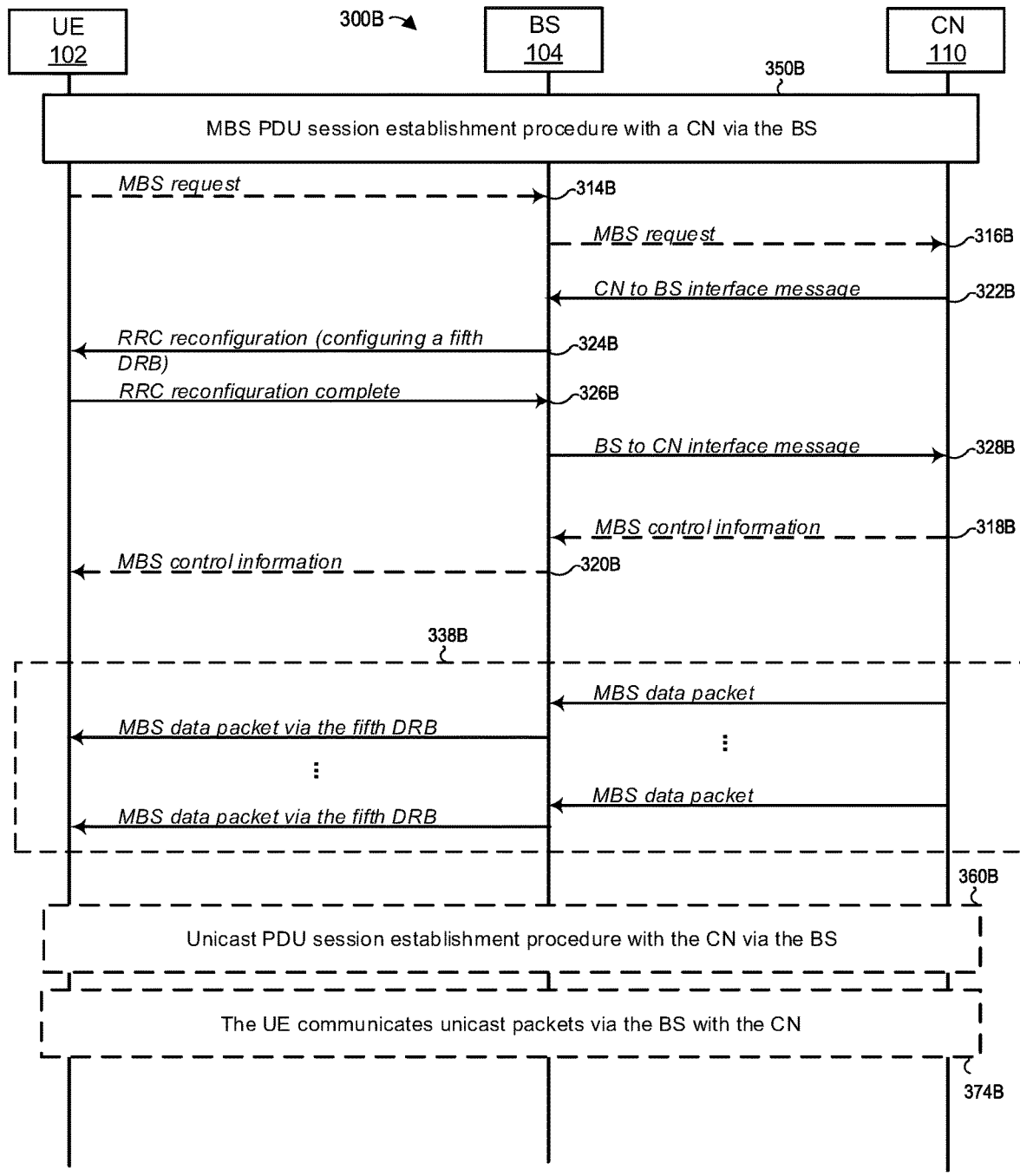
FIG. 3B is a messaging diagram of a scenario similar to the scenario of FIG. 3A, but where the base station transmits MBS data packets to the UE via a DRB associated with the PDU session and configured after the PDU establishment procedure.

FIG. 3B illustrates a scenario 300B similar to the scenario 300A of FIG. 3A. The scenario 300B is generally similar to the scenario 300A, except that the base station 104 configures an additional radio bearer (i.e., a fifth DRB) for transmitting MBS data packets to the UE 102.

Initially, the UE 102 performs 350B an MBS PDU session establishment procedure with the CN 110 via the base station 104. In some implementations, the UE 102 can transmit 314B to the base station 104, via the first DRB, an MBS request message to request, join, or register a particular MBS service. The base station 104 sends 316B the MBS request message to the CN 110, which in turn can send the MBS request message to an MBS network (not shown in FIGS. 1A and 3B), which may include an Application Function (AF), an MBS Function (MBSF), Multicast Session Function (MSF), and/or one or more suitable network nodes for MBS. As mentioned in connection with event 314A, the UE 102 may transmit 314B the MBS request via an SRB or the first DRB, or may refrain from transmitting 314B an explicit request for an MBS service. For example, the PDU Session Establishment Request message (during procedure 350B) may indicate an MBS service that the UE 102 is interested in receiving. In yet other implementations, the CN 110 can transmit a message to the base station 104 requesting that the base station 104 transmit an MBS service to the UE 102 (e.g., an emergency broadcast).

After establishing the first PDU Session for MBS with the UE 102 at event 350B or receiving the MBS request message at event 316B, the CN 110 can send 322B to the base station 104 a CN to BS interface message (e.g., a PDU SESSION RESOURCE MODIFY REQUEST message) that causes the base station 104 to configure a DRB for receiving MBS data packets for the UE 102. In response to the CN to BS interface message, the base station 104 transmits 324B to the UE 102 an RRC reconfiguration message including a DRB configuration (e.g., a fifth DRB configuration) configuring a DRB (e.g., a fifth DRB). The UE 102 can transmit 326B an RRC reconfiguration complete message to the base station 104 in response to the RRC reconfiguration message. In response to the CN to BS interface message that the base station 104 receives 322B, the base station 104 can send 328B a BS to CN interface message (e.g., PDU SESSION RESOURCE MODIFY RESPONSE message) to the CN 110 before or after transmitting 324B the RRC reconfiguration message or receiving 326B the RRC reconfiguration complete message.

After the CN 110 determines that the base station 104 has configured radio resources that the UE 102 can use to receive MBS data packets (i.e., the UE 102 establishes the fifth DRB), the CN 110 sends 338B MBS data packets to the base station 104, which in turn transmits 338B the MBS data packets to the UE 102 via the fifth DRB. Thus, the UE 102 receives 338B MBS data packets from the base station 104 over the fifth DRB. The CN 110 can receive the MBS data packets from the MBS network.

In addition, before, during, or after the MBS PDU session establishment procedure 350B, the UE 102 can perform 360B a first unicast PDU session establishment procedure with the CN 110 via the base station 104 and communicate 374B unicast packets with the CN 110 via the base station 104.

In some implementations, the RRC reconfiguration message that the base station 104 transmits 324B includes physical layer configuration parameters, MAC configuration parameters, and/or RLC configuration parameters configuring radio resources dedicated to the UE 102. For example, the RRC reconfiguration message that the base station 104 transmits 324B can include a CellGroupConfig information element (IE) configuring the configuration parameters. In some implementations, the RLC configuration parameters in the RRC reconfiguration message that the base station 104 transmits 324B can be the same or different from the RLC configuration parameters in the RRC reconfiguration message the base station 104 transmits during the MBS PDU session establishment procedure 350B to configure the first DRB. In some implementations, the base station 104 configures the UE 102 to use an RLC UM for the fifth DRB in the RLC configuration parameters.

In some implementations, the CN 110 can include a PDU Session Modification Command message in the CN to BS interface message the CN 110 transmits 322B to configure a quality of service (QoS) flow for the UE 102, similar to the second QoS flow described for FIG. 3A. The base station 104 can include the PDU Session Modification Command message in a DL RRC message and transmit the DL RRC message to the UE 102. For example, the DL RRC message can be the RRC reconfiguration message that the base station 104 transmits 324B, an additional RRC reconfiguration message, or a DLInformationTransfer message. The UE 102 can transmit an RRC reconfiguration complete message in response to the additional RRC reconfiguration message.

The base station 104 can indicate that the fifth DRB is associated with the first PDU Session and/or the QoS flow in the RRC reconfiguration message that the base station 104 transmits 324B. For example, the fifth DRB configuration can include a PDU session identity of the first PDU Session and/or a QoS flow identity of the QoS flow.

The UE 102 can send a PDU Session Modification Complete message to the CN 110 via the base station 104 in response to the PDU Session Modification Command message. In some implementations, the UE 102 can include the PDU Session Modification Complete message in a UL RRC message and transmit the UL RRC message to the base station 104, which in turn extracts the PDU Session Modification Complete message from the UL RRC message and sends the PDU Session Modification Complete message to the CN 110. In some implementations, the base station 104 can include the PDU Session Modification Complete message in the BS to CN interface message that the base station 104 transmits 328B. In other implementation, the base station 104 can send an additional BS to CN interface message (e.g., Uplink NAS Transport message) including the PDU Session Modification Complete message to the CN 110. In some implementations, the UL RRC message can be the RRC reconfiguration complete message responding to the RRC reconfiguration message that the UE 102 receives 324B or the additional RRC reconfiguration message. In other implementations, the UL RRC message can be a ULInformationTransfer message.

After the CN 110 determines that the base station 104 has configured radio resources for the first PDU Session or for the UE 102 to receive MBS data packets, the CN 110 in some implementations can send 318B MBS control information to the base station 104, which in turn transmits 320B the MBS control information to the UE 102, e.g. via an SRB, the first DRB, or the fifth DRB. Alternatively, the base station 104 generates the MBS control information instead of receiving the MBS control information from the CN 110 and transmits 320B the MBS control information to the UE 102, e.g. via an SRB, the first DRB, or the fifth DRB. The MBS control information helps the UE 102 to receive 338B MBS data packets. Event 318B can occur before or after event 328B, 322B or 316B. Event 320B can occur before or after event 326B, 324B or 314B.

In some implementations, the CN 110 can make the determination that the base station 104 has configured radio resources for the first PDU Session in response to the PDU SESSION RESOURCE SETUP RESPONSE message or the MBS request message. In some implementations, the CN 110 can make such determination that the UE 102 has been configured radio resources for receiving MBS data packets in response to the BS to CN interface message that the CN 110 receives 328B or the additional BS to CN interface message. After the CN 110 determines that the UE 102 has been configured radio resources for receiving MBS data packets, the CN 110 in some implementations can send 338B MBS data packets to the base station 104, which in turn transmits the MBS data packets to the UE 102 via the fifth DRB. In cases involving a group of UEs, the CN 110 in other implementations can send 338B MBS data packets of the particular MBS service to the base station 104 irrespective of whether the UE 102 has been configured radio resources for the first PDU Session.

Figure 3C:
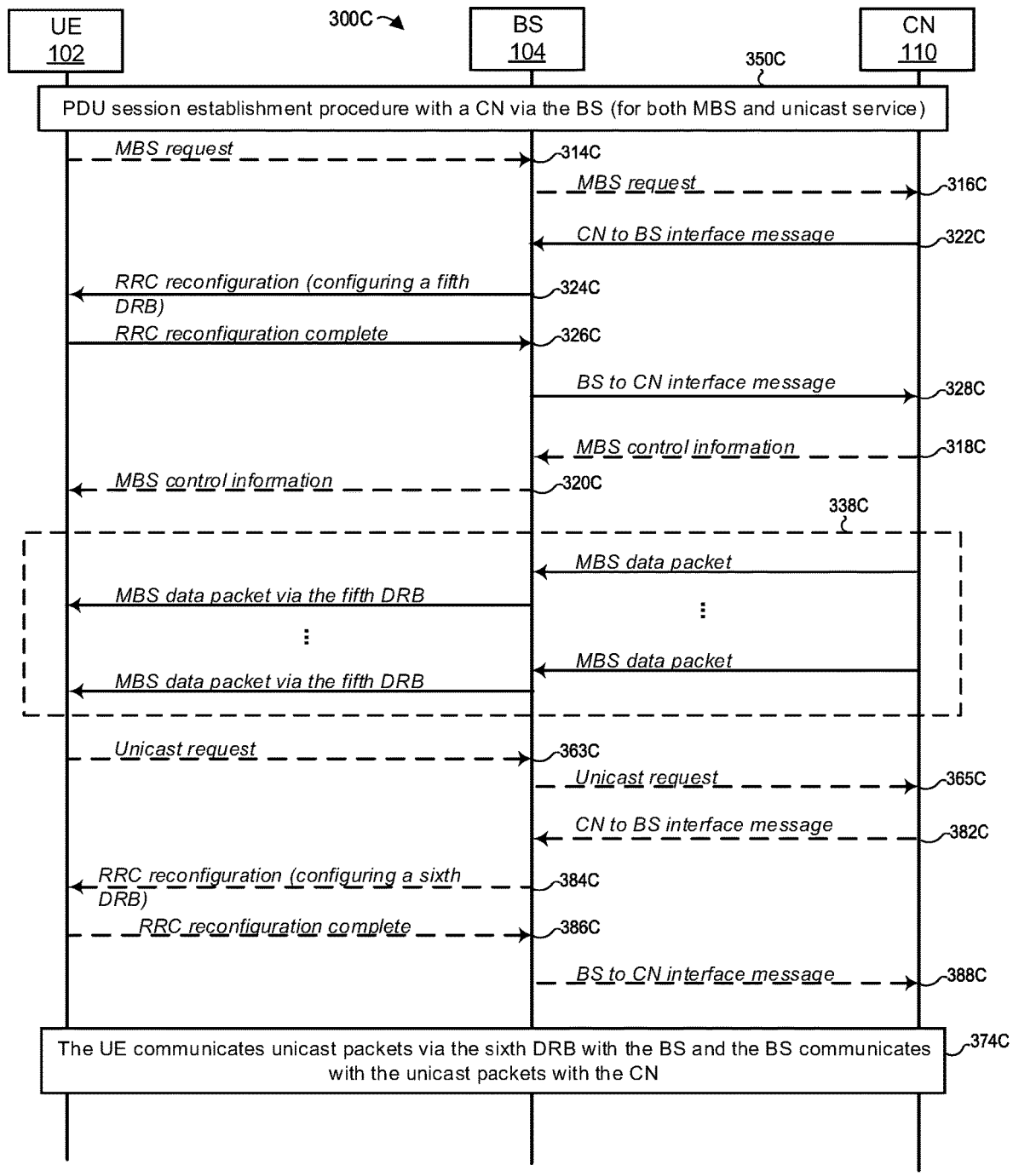
FIG. 3C is a messaging diagram of an example scenario similar to the scenario of FIG. 3B, but where PDU session is for both MBS transmissions and unicast transmissions to the UE.

Turning to FIG. 3C, a scenario 300C is generally similar to the scenario 300B. However, the UE 102 performs 350C a PDU session establishment procedure with the CN 110 via the base station 104 for both MBS and unicast service(s) (e.g., IMS service(s) and/or internet service). Thus, in contrast to the scenarios 300A and 300B, the UE 102 can receive both MBS and unicast service(s) through the same PDU session. The messaging during the PDU session establishment procedure 350C is generally similar to the messaging during the MBS PDU session establishment procedure 350A, except that the UE 102 initially transmits a PDU Session Establishment Request message for establishing a PDU session for an MBS service and unicast services to the base station 104, similar to the event 302A.

Events 314C, 316C, 322C, 324C, 326C, 328C, 318C, 336C, and 338C for configuring MBS transmissions to the UE 102 may be similar to the events 314B, 316B, 322B, 324B, 326B, 328B, 318B, 336B, and 338B, respectively. Before, after, or during these events for configuring MBS transmissions, the UE 102 can transmit 363C a unicast request message to the base station 104 in order to request a particular unicast service, and the base station 104 can transmit 365C the unicast request message to the CN 110. In some implementations, the UE 102 transmits 363C the unicast request message over the first DRB configured during the PDU session establishment procedure 350C. Further, in some implementations, the unicast request message can be a SIP message, discussed above with reference to event 374A.

In response to receiving 365C the unicast request message, the CN 110 can transmit 382C a CN to BS interface message (e.g., a PDU SESSION RESOURCE MODIFY REQUEST message) that causes the base station 104 to configure a DRB for receiving unicast data packets for the UE 102. In response to receiving 382C the CN to BS interface message, the base station 104 transmits 384C to the UE 102 an RRC reconfiguration message including a DRB configuration (e.g., a sixth DRB configuration) configuring a DRB (e.g., a sixth DRB). The UE 102 can transmit 386C an RRC reconfiguration complete message to the base station 104 in response to the RRC reconfiguration message. In response to the CN to BS interface message the base station receives 382C, the base station 104 can send 388C a BS to CN interface message (e.g., PDU SESSION RESOURCE MODIFY RESPONSE message) to the CN 110 before or after transmitting 384C the RRC reconfiguration message or receiving 386C the RRC reconfiguration complete message. The UE 102 can then communicate 374C unicast packets with the CN via the base station 104 over the sixth DRB. The messages 382C, 384C, 386C, and 388C for configuring the sixth DRB may be similar to the events 322C, 324C, 326C, and 328C for configuring the fifth DRB, except that that the sixth DRB is for a unicast service rather than an MBS service.

In some implementations, the CN 110 can include a PDU Session Modification Command message in the CN to BS interface message to configure a quality of service (QoS) flow for transmission of unicast data packets to and/or from the UE 102. The CN 110 associates unicast data packets to a QoS profile of the QoS flow including a plurality of QoS parameters. The CN 110 and the base station 104 enforce the QoS profile on transmissions of the unicast data packets to and/or from the UE 102. The base station 104 then transmits the PDU Session Modification Command message to the UE 102. In some implementations, the base station 104 can include the PDU Session Modification Command message in a DL RRC message and transmit the DL RRC message to the UE 102. For example, the DL RRC message can be the RRC reconfiguration message that the base station 104 transmits 384C, an additional RRC reconfiguration message, or a DLInformationTransfer message. The UE 102 can transmit an RRC reconfiguration complete message in response to the additional RRC reconfiguration message. Thus, the UE 102 can communicate unicast data packets on the QoS flow with the CN 110 via the base station 104 (e.g., over the fifth DRB).

In some implementations, the base station 104 can transmit MBS data packets and unicast data packets over the same radio bearer (e.g., the fifth DRB or the sixth DRB) associated with the PDU session (e.g., if similar or the same QoS profiles apply to the MBS data packets and unicast data packets). For example, the UE 102 may establish a PDU session in response to a user of the UE 102 requesting a web browsing service. While browsing, the user may select an MBS service for viewing, such as a live sporting event. The DRB associated with the PDU session may be configured to transmit both unicast data packets related to the web browsing service and MBS data packets related to the sporting event. In other implementations, the base station transmits MBS data packets and unicast data packets over the fifth DRB and the sixth DRB respectively, e.g., if different QoS profiles apply to the MBS data packets and unicast data packets.

Figure 4:
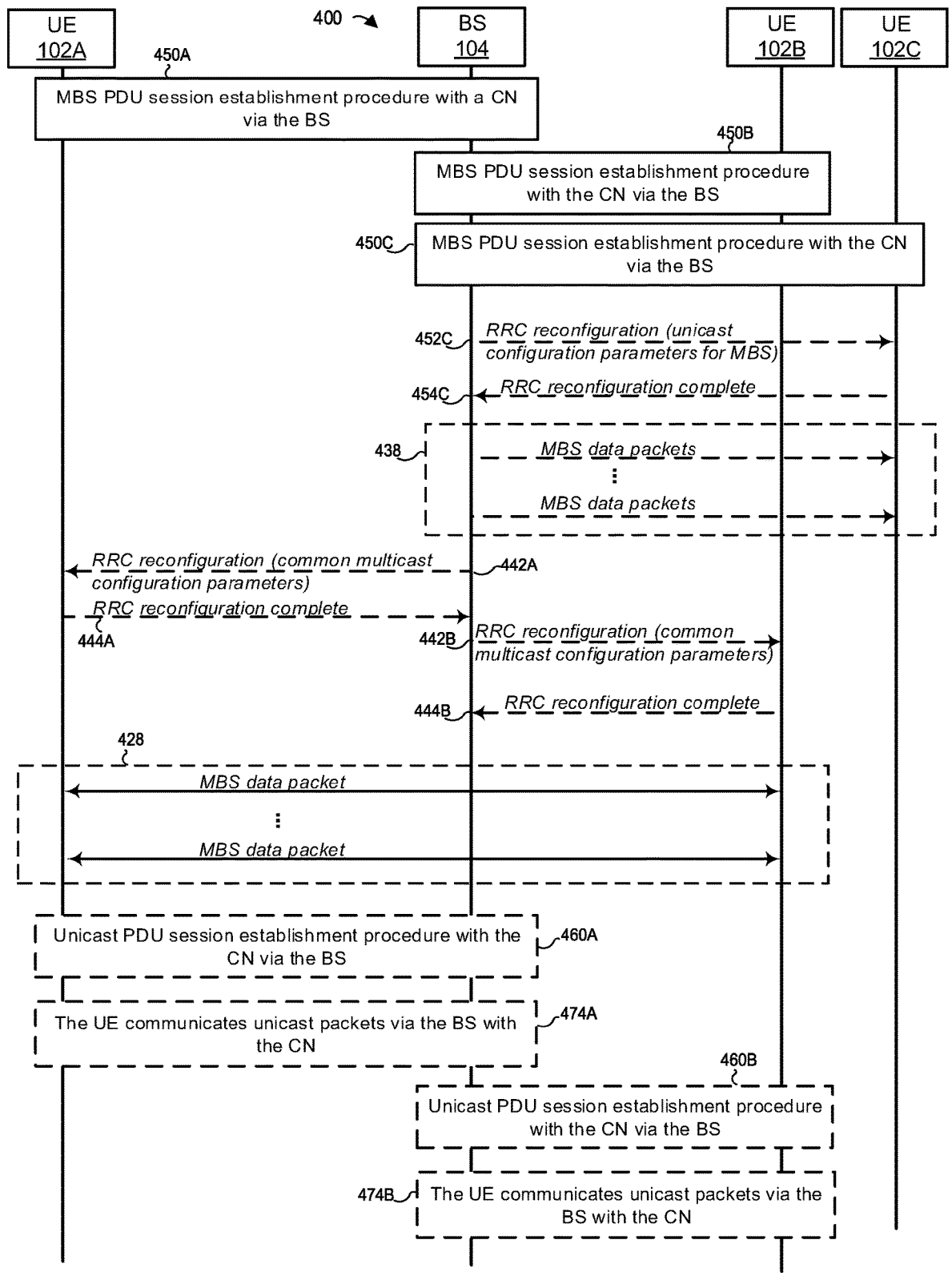
FIG. 4 is a messaging diagram of an example scenario in which a base station establishes PDU sessions with multiple UEs for MBS transmissions to the UEs.

Referring next to FIG. 4, during a scenario 400, the base station 104 establishes PDU sessions with multiple UEs. The base station 104 can utilize the techniques illustrated in FIG. 4 to transmit MBS data packets over a multicast DRB to a first subset of UEs (i.e., using multicast configuration parameters) and MBS packets over unicast DRBs to respective UEs of a second subset of UEs.

To establish the PDU sessions, the base station 104 can utilize the techniques discussed above with reference to FIGS. 3A-3C to establish the PDU sessions. In particular, a UE 102A can perform 450A an MBS PDU session establishment procedure with a CN (e.g., the CN 110) via the base station 104 similar to the MBS PDU session establishment procedure 350A or 350B. In some implementations, the UE 102A can perform a PDU session establishment procedure for both MBS and unicast services, similar to the PDU session establishment procedure 350C. Likewise, a UE 102B and a UE 102C perform 450B, 450C MBS PDU session establishment procedures, respectively, with the CN 110 via the base station 104, which can be similar to procedures 350A-C. The base station 104 can perform the PDU session establishment procedures 450A-C in any order. While not depicted in FIG. 4 to avoid clutter, the scenario 400 may include additional messaging shown in FIGS. 3A-3C, such as MBS request messages and messages including MBS control information (e.g., events 314A-C, 320A-C).

The base station 104 can configure the UEs 102A-C to receive MBS data packets using either multicast or unicast configuration parameters. With respect to the UE 102C, for example, the base station 104 transmits 452C to the UE 102C an RRC reconfiguration message including unicast configuration parameters that the UE 102C is to use to receive an MBS service. The unicast configuration parameters may configure a unicast DRB. In response, the UE 102C transmits 454C an RRC reconfiguration complete message. The base station 104 can then transmit 438 MBS data packets to the UE 102C in accordance with the unicast configuration parameters. In the scenario 400, the base station 104 transmits 452C the unicast configuration parameters in a dedicated RRC message.

Before or after transmitting 452C the unicast configuration parameters to the UE 102C, the base station 104 can transmit 442A to the UE 102A an RRC reconfiguration message including multicast configuration parameters that the UE 102A is to use to receive an MBS service, which may be the same MBS service that the UE 102C receives. In response, the UE 102A transmits 444A an RRC reconfiguration complete message to the base station 104. The multicast configuration parameters may be common multicast configuration parameters that the base station 104 can also transmit to other UEs. For example, the base station 104 can transmit 442B to the UE 102B an RRC reconfiguration message including the common multicast configuration parameters. In response, the UE 102B transmits 444B an RRC reconfiguration complete message to the base station 104. The base station 104 can transmit 428 MBS data packets for the MBS service to the UEs 102A and 102B in accordance with the common multicast configuration parameters. In some implementations, the multicast configuration parameters may include a DL BWP configuration configuring an MBS DL BWP.

In the scenario 400, the base station 104 transmits 442A, 442B multicast configuration parameters to the individual UEs 102A and 102B using dedicated RRC messaging. In other scenarios, the base station 104 can broadcast the multicast configuration parameters in SIB(s) to UEs in the cell 124, including the UE 102A and the UE 102B. UEs in the idle, inactive, or connected states can receive broadcasted parameters, and UEs in the connected state can receive the dedicated RRC messages.

In some implementations, before, during, or after the MBS PDU session establishment procedures 450A and 450B, the UE 102A and the UE 102B can perform unicast PDU session establishment Procedures 460A and 460B, respectively, with CN 110 via the base station 104. The UE 102A and the UE 102B can then communicate 474A, 474B unicast packets with the CN 110 via the base station 110.

Figure 5:
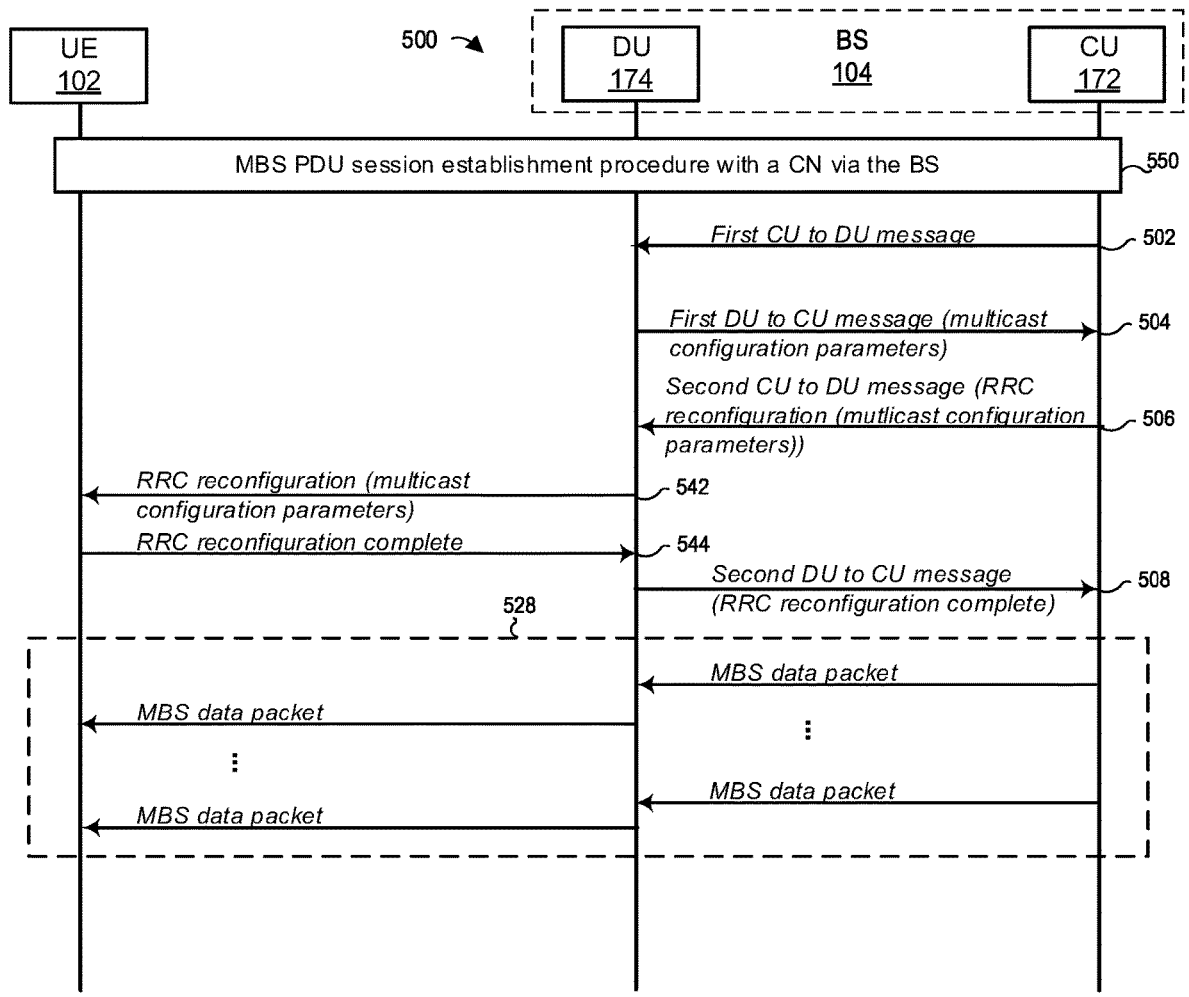
FIG. 5 is a messaging diagram of an example scenario in which a distributed base station including a DU and a CU establishes a PDU session between a CN and a UE for MBS transmissions to the UE, where the DU forwards multicast configuration parameters to the CU.

Turning to FIG. 5, a scenario 500 illustrates messaging that may occur between nodes of a distributed base station. The base station 104 includes a DU 174 and a CU 172. The messages in the scenario 500 that the DU 174 and the CU 172 exchange may also occur in the scenarios illustrated by FIGS. 3A-C and 4. Further, while not depicted in FIG. 5 to avoid clutter, the scenario 500 may include additional messaging shown in FIGS. 3A-3C, such as MBS request messages and messages including MBS control information (e.g., events 314A-C, 320A-C).

Initially, the UE 102 performs 550 an MBS PDU session establishment procedure with a CN (e.g., the CN 110) via the base station 104, similar to the MBS PDU session establishment procedures 350A and 350B. In some implementations, the UE 102 performs a PDU session establishment procedure for both MBS and unicast services, similar to the PDU session establishment procedure 350C. In the MBS PDU Session establishment procedure, the UE 102 and the CU 172 exchanges messages with one another via the DU 174. For example, the UE 102 transmits a message (e.g., PDU Session Establishment Request, RRC reconfiguration complete, MBS request, etc.) to the DU 174, which in turn sends a CU to DU message (e.g., a UL RRC Message Transfer message) including the message to the CU 172. Similarly, the CU 172 transmits a CU to DU message (e.g., a DL RRC Message Transfer message) including a message (e.g., PDU Session Establishment Accept, RRC reconfiguration, MBS control information, etc.) to the DU 174, which in turn sends the message to the UE 102.

The CU 172 transmits 502 a first CU to DU message to the DU 174 to request the DU to generate multicast configuration parameters for the UE 102. The first CU to DU message can be, for example, a UE Context Setup Request message or a UE Context Modification Request message. The DU 174 can generate the multicast configuration parameters and transmit 504 the multicast configuration parameters to the CU 172 in a first DU to CU message. The first DU to CU message can be, for example, a UE Context Setup Response message or a UE Context Modification Response message. In the scenario 502, the DU generates multicast configuration parameters (e.g., configuration parameters configuring an MRB). In other scenarios, the DU can generate unicast configuration parameters for receiving MBS transmissions, similar to the unicast configuration parameters that the base station 104 transmits at event 452C.

The CU 172 transmits 506 a second CU to DU message to the DU 174 including an RRC reconfiguration message including the multicast configuration parameters, and the DU 174 forwards 542 the RRC reconfiguration message to the UE 102. In response, the UE 102 transmits 544 an RRC reconfiguration complete message to the DU 174, which in turn transmits 508 the RRC reconfiguration complete message in a second DU to CU message to the CU 172. The UE 102 communicates 528 MBS data packets with the CN 110 via the base station 104, where the CU 172 transmits the MBS data packets to the UE 102 via the DU 174.

FIGS. 6A-15 are flow diagrams of example methods that a base station and/or a UE can implement to manage exchange of control information and data related to MBS.

Figure 6A:
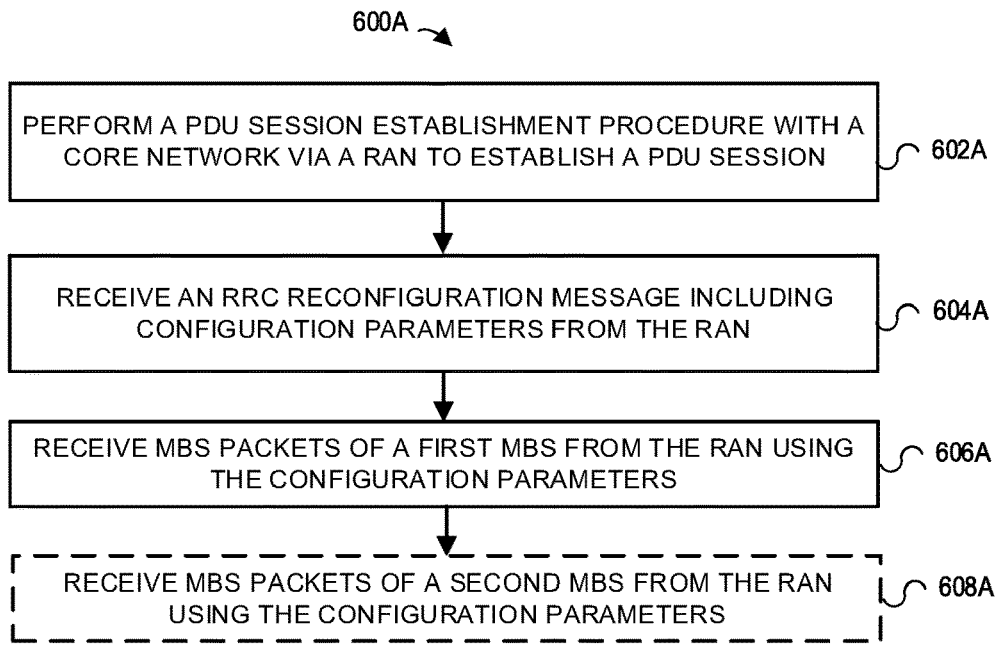
FIG. 6A is a flow diagram of an example method that includes receiving MBS packets from a RAN using configuration parameters associated with a PDU session, which can be implemented in a UE of FIG. 1A.

Turning first to FIG. 6A, an example method 600A can be implemented in a UE (e.g., the UE 102, 102A, 102B, or 102C). At block 602A, the UE performs a PDU session establishment procedure with a CN (e.g., the CN 110) via a RAN (e.g., the RAN 105) to establish a PDU session for MBS transmissions (e.g., procedures 350A-C, 450A-C, 550). At block 604A, the UE receives an RRC reconfiguration message including configuration parameters from the RAN (e.g., events 310A, 324B, 324C, 452C, 442A, 442B, or 542, or similar events within procedures 350B, 350C, 450A-C, or 550). The configuration parameters are associated with the PDU session established at block 602A. For example, the configuration parameters may configure a radio bearer (e.g., the configuration parameters may be unicast configuration parameters for a DRB or multicast configuration parameters for an MRB) associated with the PDU session.

Next, the UE receives at block 606A MBS packets of a first MBS service using the configuration parameters (e.g., events 338A-C, 438, 428, 528). In some implementations, the UE also receives at block 608A MBS packets of a second MBS service using the configuration parameters.

Figure 6B:
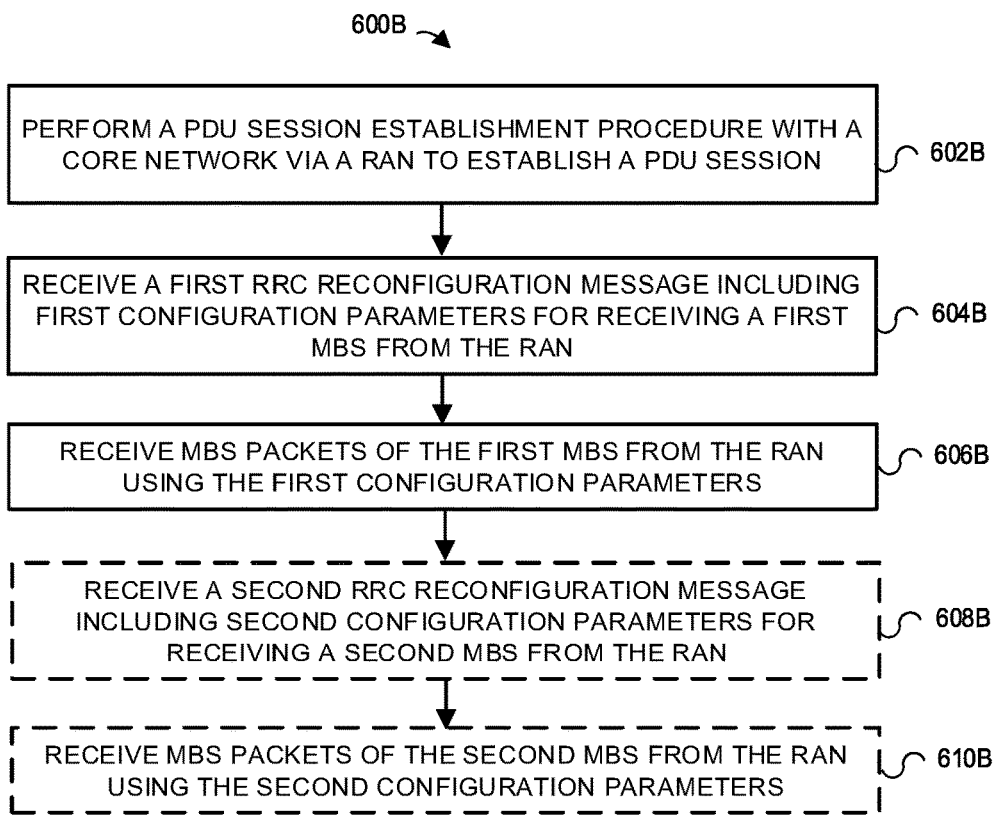
FIG. 6B is a flow diagram of an example method similar to the method of FIG. 6A, but which also includes receiving MBS packets using second configuration parameters associated with the PDU session.

Referring next to FIG. 6B, an example method 600B can be implemented in a UE (e.g., the UE 102, 102A, 102B, or 102C). The method 600B is similar to the method 600A, except that the UE can receive different configuration parameters for receiving the first and the second MBS services, respectively. At block 602B, the UE performs a PDU session establishment procedure with a CN (e.g., the CN 110) via a RAN (e.g., the RAN 105) to establish a PDU session for MBS transmissions (e.g., procedures 350A-C, 450A-C, 550). At block 604B, the UE receives, from the RAN, a first RRC reconfiguration message including first configuration parameters for receiving a first MBS service (e.g., events 310A, 324B, 324C, 452C, 442A, 442B, or 542, or similar events within procedures 350B, 350C, 450A-C, or 550). The first configuration parameters are associated with the PDU session established at block 602B. For example, the first configuration parameters may configure a radio bearer (e.g., the first configuration parameters may be unicast configuration parameters for a DRB or multicast configuration parameters for an MRB) associated with the PDU session. The UE then receives at block 606B MBS packets of the first MBS service from the RAN using the first configuration parameters (e.g., events 338A-C, 438, 428, 528).

At block 608B, the UE also receives, from the RAN, a second RRC reconfiguration message including second configuration parameters for receiving a second MBS service. Similar to the first configuration parameters, the second configuration parameters may configure a radio bearer (e.g., a DRB or an MRB) associated with the PDU session. At block 610B, the UE receives MBS packets of the second MBS service from the RAN using the second configuration parameters.

Figure 7A:
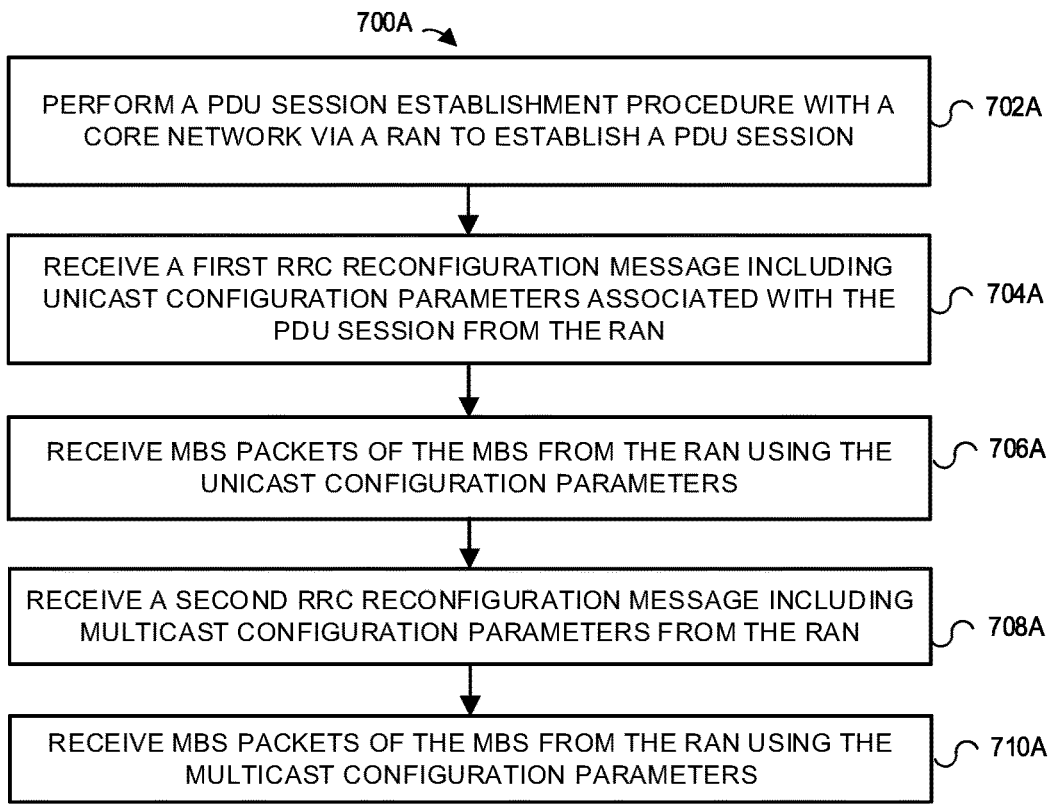
FIG. 7A is a flow diagram of an example method that includes receiving MBS packets in accordance with unicast configuration parameters associated with a PDU session and subsequently receiving MBS packets in accordance with multicast configuration parameters associated with the PDU session, which can be implemented in a UE of FIG. 1A.

Turning to FIG. 7A, an example method 700A can be implemented in a UE (e.g., the UE 102, 102A, 102B, or 102C). At block 702A, the UE performs a PDU session establishment procedure with a CN (e.g., the CN 110) via a RAN (e.g., the RAN 105) to establish a PDU session for MBS transmissions (e.g., procedures 350A-C, 450A-C, 550). At block 704A, the UE receives, from the RAN, a first RRC reconfiguration message including unicast configuration parameters associated with the PDU session (e.g., events 310A, 324B, 324C, 452C, or 542, or similar events within procedures 350B, 350C, 450A-C, or 550). The unicast configuration parameters may configure a unicast DRB. The UE can then receive at block 706A MBS packets of an MBS service from the RAN using the unicast configuration parameters (e.g., events 338A-C, 438, 528). Subsequently to block 706A, at block 708A, the UE receives, from the RAN, a second RRC reconfiguration message including multicast configuration parameters (e.g., events 310A, 324B, 324C, 442A, 442B, or 542, or similar events within procedures 350B, 350C, 450A-C, or 550). The multicast configuration parameters may be associated with the PDU session and may configure an MRB for receiving the MBS service. At block 710A, the UE can switch to receiving MBS packets of the MBS service from the RAN using the multicast configuration parameters (e.g., events 338A-C, 428, 528).

Figure 7B:
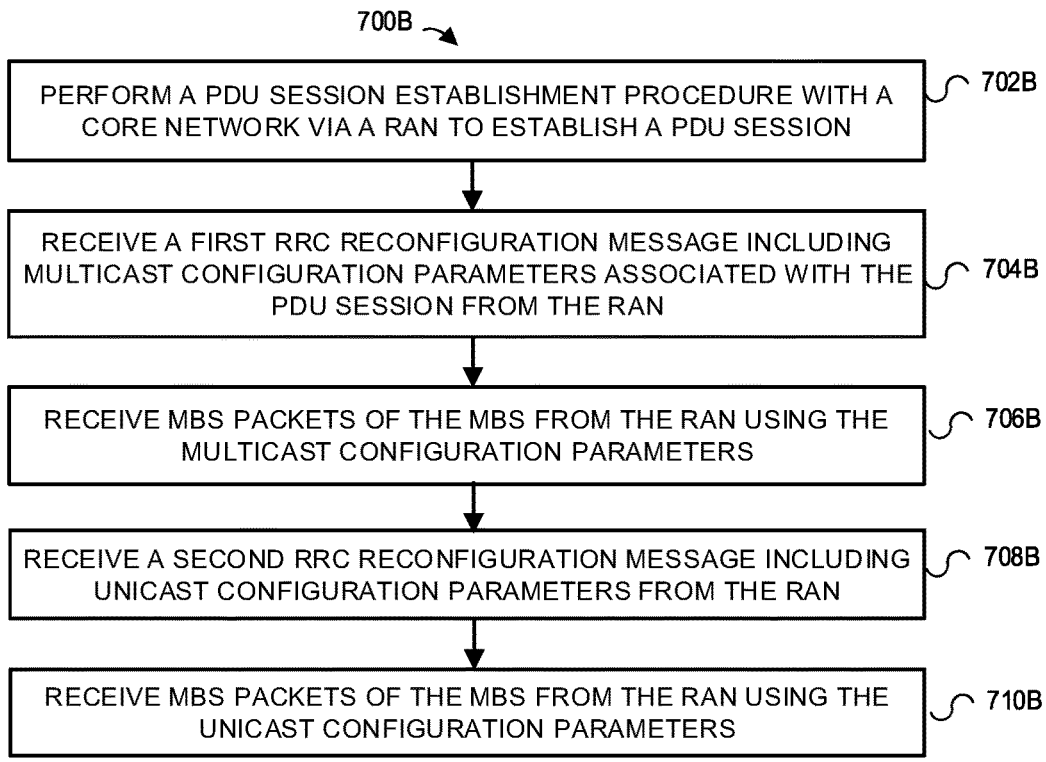
FIG. 7B is a flow diagram of an example method similar to the method of FIG. 7A, but where the UE receives the MBS packets in accordance with the multicast configuration parameters, and subsequently receives the MBS packets in accordance with the unicast configuration parameters.

FIG. 7B illustrates an example method 700B, which can be implemented in a UE (e.g., the UE 102, 102A, 102B, or 102C). The method 700B is similar to the method 700A, except that the UE initially receives MBS packets in accordance with multicast configuration parameters, and subsequently receives MBS packets in accordance with unicast configuration parameters.

At block 702B, the UE performs a PDU session establishment procedure with a CN (e.g., the CN 110) via a RAN (e.g., the RAN 105) to establish a PDU session for MBS transmissions (e.g., procedures 350A-C, 450A-C, 550). At block 704B, the UE receives, from the RAN, a first RRC reconfiguration message including multicast configuration parameters associated with the PDU session (e.g., events 310A, 324B, 324C, 442A, 442B, or 542, or similar events within procedures 350B, 350C, 450A-C, or 550). The UE can then receive at block 706B MBS packets of an MBS service from the RAN using the multicast configuration parameters (e.g., events 338A-C, 428, 528). Subsequently to block 706B, at block 708B, the UE receives, from the RAN, a second RRC reconfiguration message including unicast configuration parameters (e.g., events 310A, 324B, 324C, 452C, or 542, or similar events within procedures 350B, 350C, 450A-C, or 550). The unicast configuration parameters may be associated with the PDU session and may configure a unicast DRB for receiving the MBS service. At block 710B, the UE can switch to receiving MBS packets of the MBS service from the RAN using the unicast configuration parameters (e.g., event 338A-C, 438, 528).

Figure 7C:
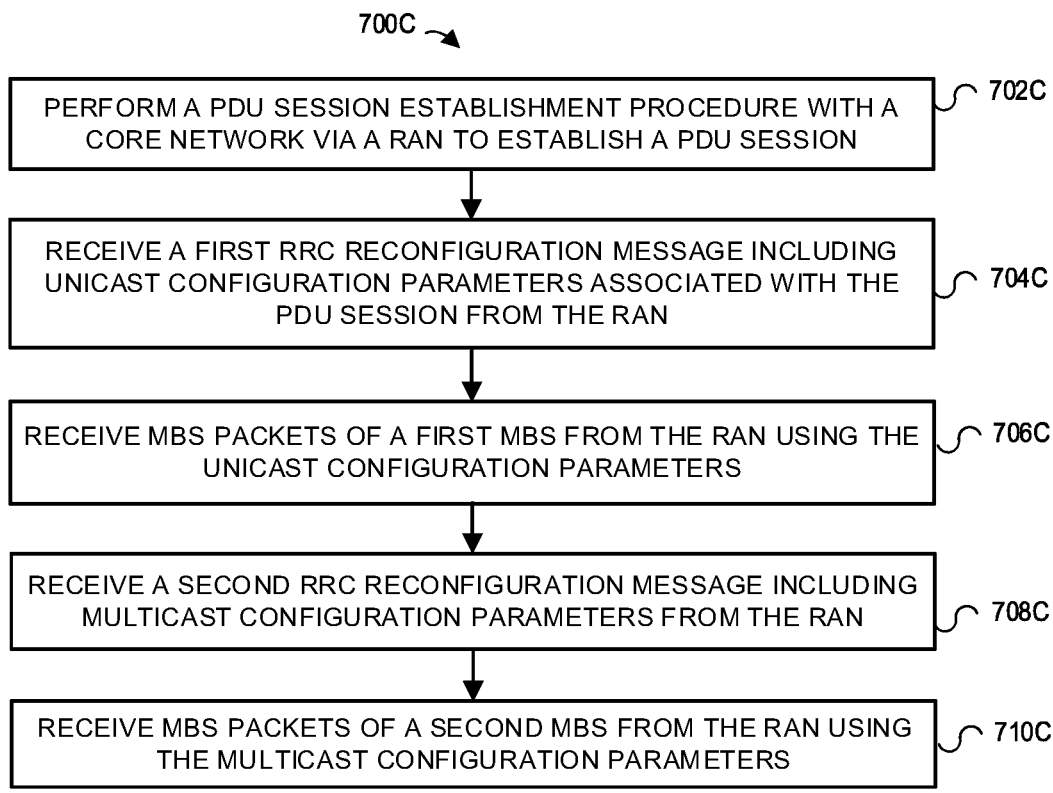
FIG. 7C is a flow diagram of an example method similar to the method of FIG. 7A, but where the UE receives MBS packets of a first MBS service in accordance with the unicast configuration parameters, and receives MBS packets of a second MBS service in accordance with the multicast configuration parameters.

FIG. 7C illustrates an example method 700C, which can be implemented in a UE (e.g., the UE 102, 102A, 102B, or 102C). The method 700C is similar to the methods 700A and 700B, except that the UE can use configuration parameters in a first RRC reconfiguration message to receive a first MBS service, and configuration parameters in a second RRC reconfiguration message to receive a second MBS service.

At block 702C, the UE performs a PDU session establishment procedure with a CN (e.g., the CN 110) via a RAN (e.g., the RAN 105) to establish a PDU session for MBS transmissions (e.g., procedures 350A-C, 450A-C, 550). At block 704C, the UE receives, from the RAN, a first RRC reconfiguration message including unicast configuration parameters associated with the PDU session (e.g., e.g., events 310A, 324B, 324C, 452C, or 542, or similar events within procedures 350B, 350C, 450A-C, or 550). The UE can then receive at block 706C MBS packets of a first MBS service from the RAN using the unicast configuration parameters (e.g., events 338A-C, 438, 528). At block 708C, the UE receives, from the RAN, a second RRC reconfiguration message including multicast configuration parameters (e.g., events 310A, 324B, 324C, 442A, 442B, or 542, or similar events within procedures 350B, 350C, 450A-C, or 550). The multicast configuration parameters may be associated with the PDU session and may configure an MRB for receiving an MBS service. At block 710C, the UE can switch to receiving MBS packets of a second MBS service from the RAN using the multicast configuration parameters (e.g., event 338A-C, 428, 528). While FIG. 7C illustrates using unicast configuration parameters to receive a first MBS service and multicast configuration parameters to receive a second MBS service, the UE can implement a similar method to first use multicast configuration parameters to receive the first MBS service, and subsequently use unicast configuration parameters to receive the second MBS service. In some implementations, the UE can simultaneously receive MBS packets of the first MBS service from the RAN using the unicast configuration parameters and receive MBS packets of the second MBS service from the RAN using the multicast configuration parameters.

Figure 8:
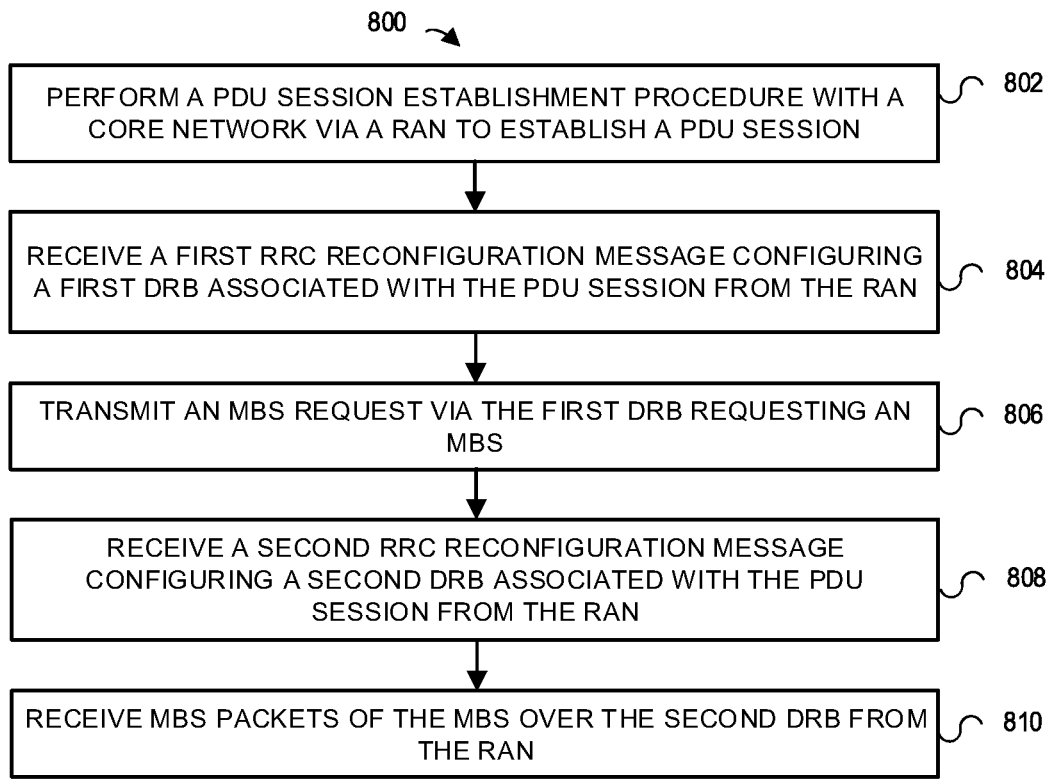
FIG. 8 is a flow diagram of an example method that includes transmitting, over a first DRB associated with a PDU session, a request for an MBS service and receiving MBS packets of the MBS over a second DRB associated with the PDU session, which can be implemented in a UE of FIG. 1A.

Turning to FIG. 8, an example method 800 can be implemented in a UE (e.g., the UE 102, 102A, 102B, or 102C). In the method 800, the UE transmits an MBS request via a first DRB associated with a PDU session, and receives MBS packets of an MBS service over a second DRB associated with the PDU session.

At block 802, the UE performs a PDU session establishment procedure with a CN (e.g., the CN 110) via a RAN (e.g., the RAN 105) to establish a PDU session for MBS transmissions (e.g., procedures 350A-C, 450A-C, 550). At block 804, the UE receives, from the RAN, a first RRC reconfiguration message configuring a first DRB (e.g., a unicast DRB or an MRB) associated with the PDU session (e.g., event 310 or similar events during procedures 350B, 350C, 450A-C, or 550). At block 806, the UE transmits an MBS request via the first DRB requesting an MBS service (e.g., events 314A-C). In response to the MBS request, at block 808, the UE receives, from the RAN, a second RRC reconfiguration message configuring a second DRB (e.g., a unicast DRB or an MRB) associated with the PDU session (e.g., events 342B, 342C). At block 810, the UE receives MBS packets of the MBS service over the second DRB from the RAN (e.g., events 338B, 338C).

Figure 9A:
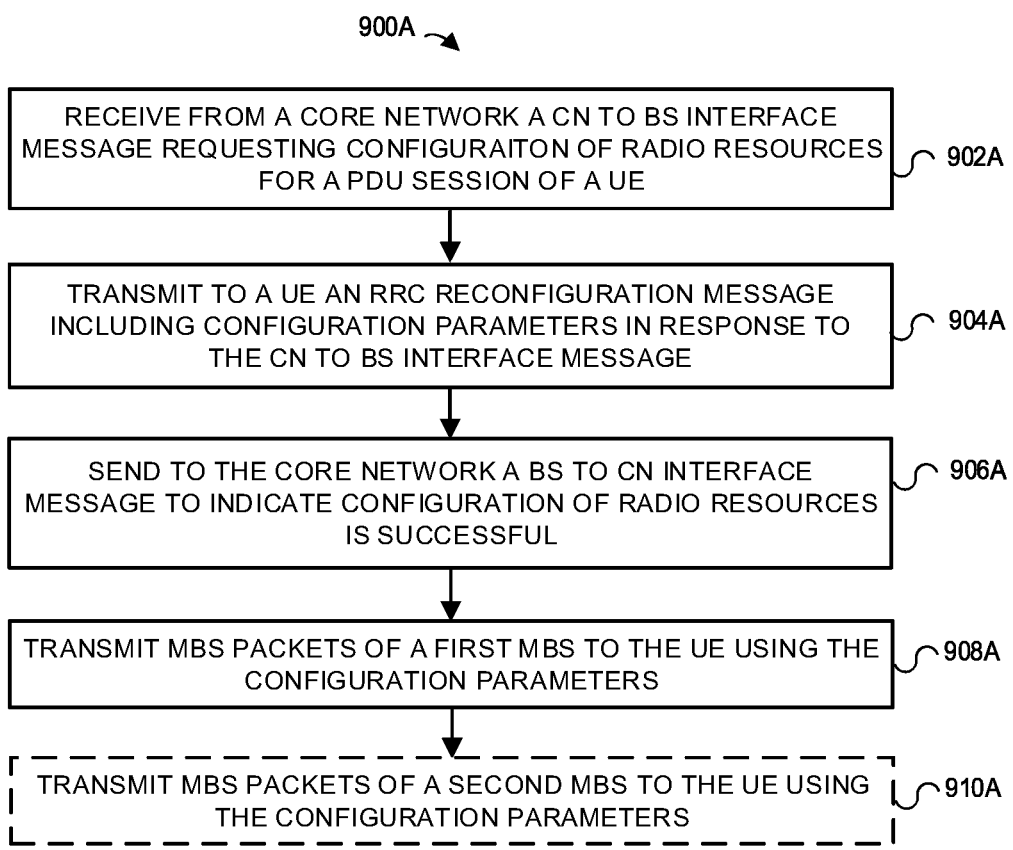
FIG. 9A is a flow diagram of an example method that includes transmitting MBS packets to a UE in accordance with configuration parameters associated with a PDU session, which can be implemented in a base station of FIG. 1A.

Referring next to FIG. 9A, a base station (e.g., the base station 104, 106A, or 106B) can implement an example method 900A. The method 900A is similar to the method 600A, but the method 900A includes steps implemented by the base station rather than the UE.

At block 902A, the base station receives, from a CN (e.g., the CN 110), a CN to BS interface message requesting configuration of radio resources for a PDU session of a UE (e.g., the UE 102, 102A, 102B, or 102C) (e.g., event 306A, 322B, 322C or similar events within procedures 350B, 350C, 450A-C, or 550). At block 904A, the base station transmits, to the UE in response to the CN to BS interface message, an RRC reconfiguration message including configuration parameters (e.g., events 310A, 324B, 324C, 452C, 442A, 442B, or 542, or similar events within procedures 350B, 350C, 450A-C, or 550). For example, the configuration parameters may configure a radio bearer (e.g., the configuration parameters may be unicast configuration parameters for a DRB or multicast configuration parameters for an MRB) associated with the PDU session. At block 906A, the base station sends a BS to CN interface message to the CN to indicate that configuration of radio resources for the UE is successful (e.g., events 328B, 328C).

At block 908A, the base station transmits MBS packets of a first MBS service to the UE using the configuration parameters associated with the PDU session (e.g., events 338A-C, 438, 428, 528). In some implementations, the base station also transmits at block 910A MBS packets of a second MBS service using the configuration parameters.

Figure 9B:
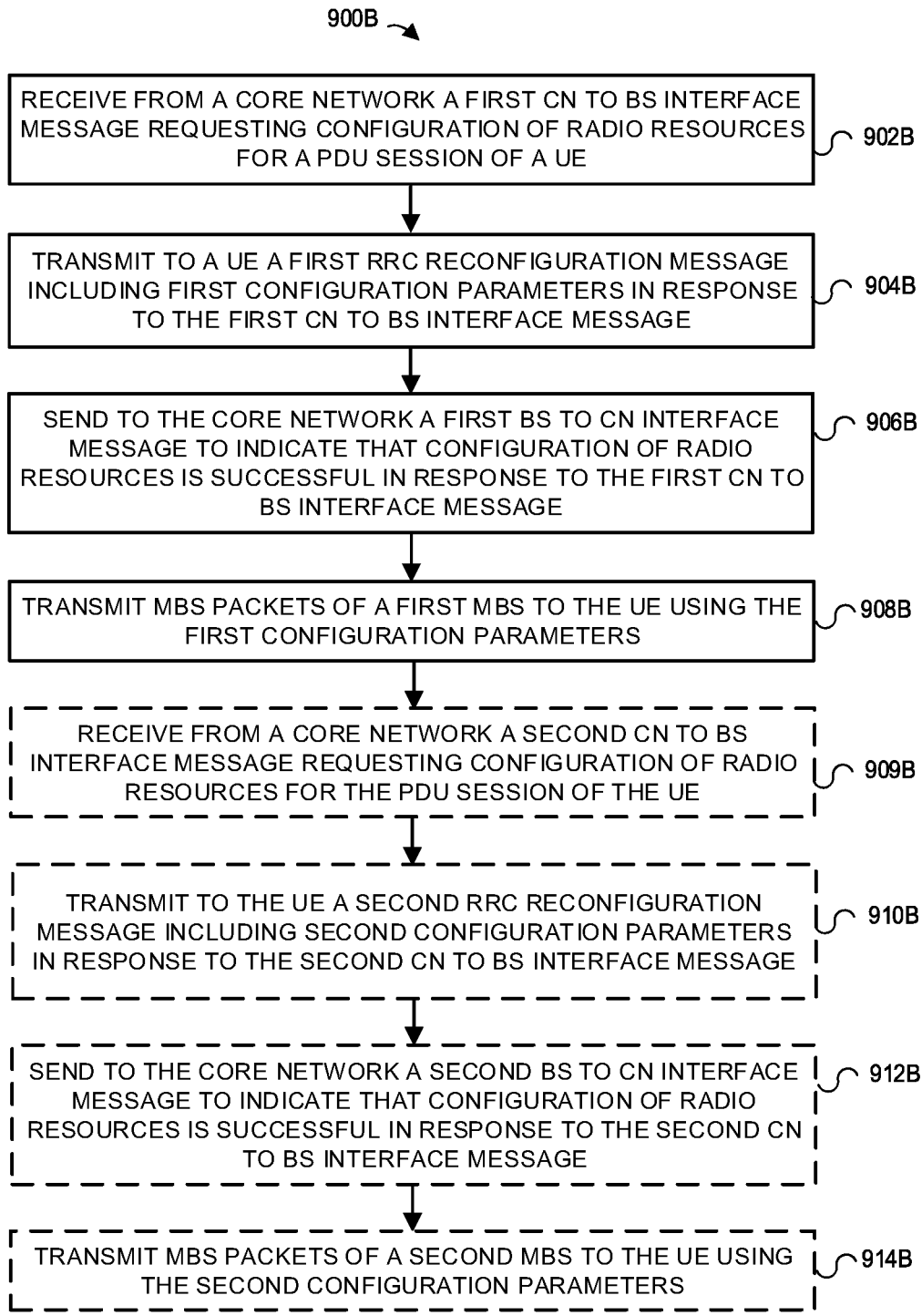
FIG. 9B is a flow diagram of an example method similar to the method of FIG. 9A, but which also includes transmitting MBS packets of a second MBS service to the UE in accordance with second configuration parameters associated with the PDU session.

FIG. 9B illustrates an example method 900B that can be implemented in a base station (e.g., the base station 104, 106A, or 106B). The method 900B is similar to the method 900A, except that the base station can transmit a first and a second MBS service using different configuration parameters. Likewise, the method 900B is similar to the method 600B, but the method 900B includes steps implemented by the base station rather than the UE.

At block 902B, the base station receives, from a CN (e.g., the CN 110), a first CN to BS interface message requesting configuration of radio resources for a PDU session of a UE (e.g., the UE 102, 102A, 102B, or 102C) (e.g., event 306A, 322B, 322C or similar events within procedures 350B, 350C, 450A-C, or 550). At block 904B, the base station transmits, to the UE in response to the first CN to BS interface message, a first RRC reconfiguration message including first configuration parameters (e.g., events 310A, 324B, 324C, 452C, 442A, 442B, or 542, or similar events within procedures 350B, 350C, 450A-C, or 550). For example, the first configuration parameters may configure a radio bearer (e.g., the first configuration parameters may be unicast configuration parameters for a DRB or multicast configuration parameters for an MRB) associated with the PDU session. At block 906B, the base station sends a first BS to CN interface message to the CN to indicate that configuration of radio resources for the UE is successful (e.g., events 328B, 328C). At block 908B, the base station transmits MBS packets of a first MBS service to the UE using the first configuration parameters (e.g., events 338A-C, 438, 428, 528).

At block 909B, the base station receives, from the CN, a second CN to BS interface message requesting configuration of radio resources for the PDU session of the UE (e.g., the UE 102, 102A, 102B, or 102C) (e.g., event 306A, 322B, 322C or similar events within procedures 350B, 350C, 450A-C, or 550). At block 910B, the base station transmits to the UE a second RRC reconfiguration message including second configuration parameters in response to the second CN to BS interface message. Similar to the first configuration parameters, the second configuration parameters may configure a radio bearer (e.g., a DRB or an MRB) associated with the PDU session. At block 912B, the base station sends to the CN a second BS to CN interface message to indicate that configuration of radio resources for the UE is successful. At block 914B, the base station transmits MBS packets of a second MBS service to the UE using the second configuration parameters.

In one implementation, the CN can request configuration of radio resources for a first QoS flow and a second QoS flow in the first CN to BS interface message and the second CN to BS interface message, respectively. Accordingly, the base station configures the configuration parameters for the first QoS flow and the configuration parameters for the second QoS flow in the first RRC reconfiguration message and the second RRC reconfiguration message, respectively. In another implementation, the CN can request configuration of radio resources for a first QoS flow and a second QoS flow in a single CN to BS interface message (i.e., the first CN to BS interface message). In this case, the event 909B can be skipped. The base station configures the configuration parameters for the first QoS flow and second QoS flow in the first RRC reconfiguration message and the second RRC reconfiguration message, respectively. Alternatively, the base station configures the configuration parameters for the first QoS flow and second QoS flow in a single RRC reconfiguration message (i.e., the first RRC reconfiguration message). The base station indicates the configuration of radio resources is successful for the first and second QoS flows either at the event 906B or 912B, i.e. one of the events 906B or 912B can be skipped.

In either implementation above, the CN sends MBS packets of the first MBS on the first QoS flow and sends the MBS packets of the second MBS on the second QoS flow to the base station, which in turn transmits the MBS packets of the first MBS and the MBS packets of the second MBS to the UE using the first configuration parameters and the second configuration parameters, respectively.

Figure 10A:
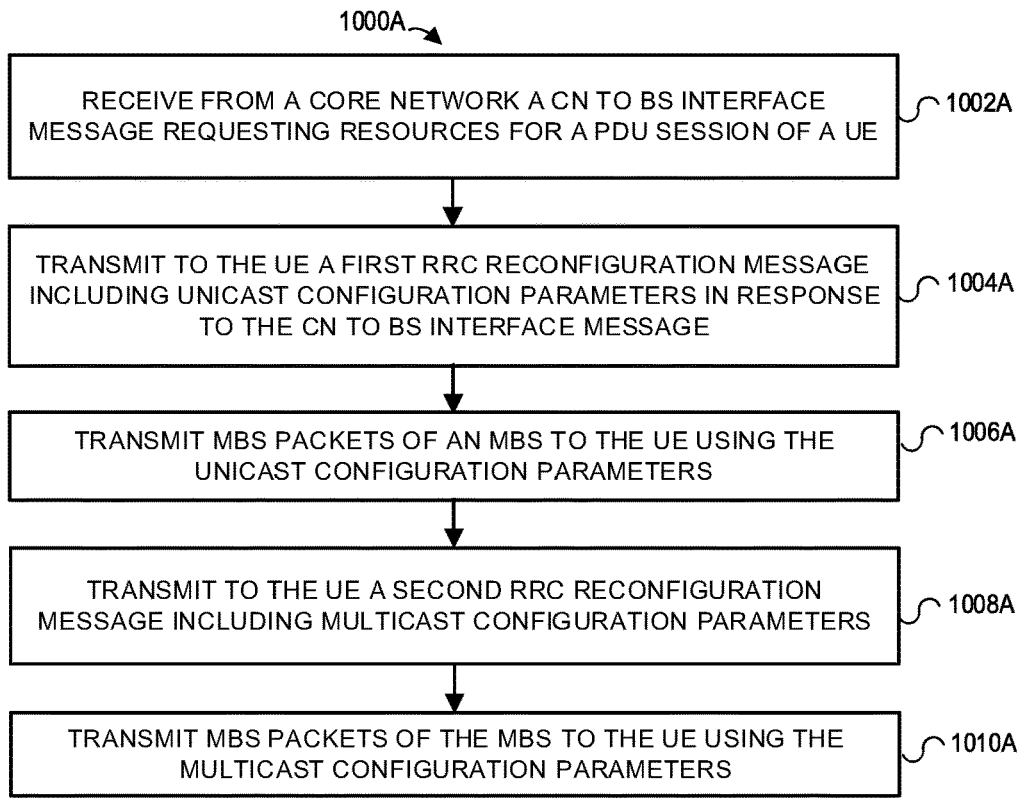
FIG. 10A is a flow diagram of an example method that includes transmitting MBS packets of an MBS service to a UE in accordance with unicast configuration parameters associated with a PDU session, and subsequently transmitting MBS packets of the MBS to the UE in accordance with multicast configuration parameters associated with the PDU session, which can be implemented in a base station of FIG. 1A.

Turning to FIG. 10A, a base station (e.g., the base station 104, 106A, or 106B) can implement an example method 1000A. The method 1000A is similar to the method 700A, but the method 1000A includes steps implemented by the base station rather than the UE. At block 1002A, the base station receives, from a CN (e.g., the CN 110), a first CN to BS interface message requesting configuration of radio resources for a PDU session of a UE (e.g., the UE 102, 102A, 102B, or 102C) (e.g., event 306A, 322B, 322C or similar events within procedures 350B, 350C, 450A-C, or 550). At block 1004A, the base station transmits to the UE a first RRC reconfiguration message including unicast configuration parameters, in response to the CN to BS interface message (e.g., events 310A, 324B, 324C, 452C, or 542, or similar events within procedures 350B, 350C, 450A-C, or 550). The unicast configuration parameters may configure a unicast DRB. The base station then transmits at block 1006A MBS packets of an MBS service to the UE using the unicast configuration parameters (e.g., events 338A-C, 438, 528). Subsequently to block 1006A, at block 1008A, the base station transmits to the UE a second RRC reconfiguration message including multicast configuration parameters (e.g., events 310A, 324B, 324C, 442A, 442B, or 542, or similar events within procedures 350B, 350C, 450A-C, or 550). At block 1010A, the base station transmits MBS packets of the MBS service to the UE using the multicast configuration parameters (e.g., events 338A-C, 428, 528).

Figure 10B:
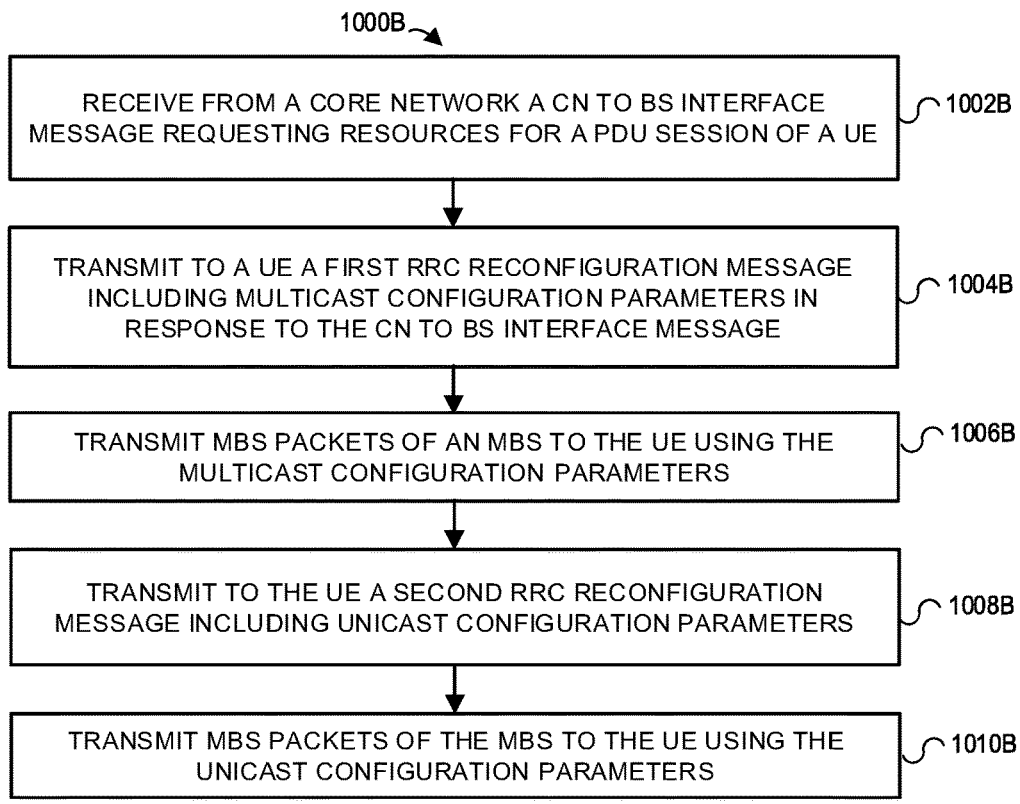
FIG. 10B is a flow diagram of an example method similar to the method of FIG. 10A, but where the base station transmits the MBS packets in accordance with the multicast configuration parameters, and subsequently transmits the MBS packets to the UE in accordance with the unicast configuration parameters.

FIG. 10B illustrates an example method 1000B that can be implemented in a base station (e.g., the base station 104, 106A, or 106B). The method 1000B is similar to the method 1000A, except that the base station initially transmits MBS packets in accordance with multicast configuration parameters, and subsequently transmits MBS packets in accordance with unicast configuration parameters. Likewise, the method 1000B is similar to the method 700B, but the method 1000B includes steps implemented by the base station rather than the UE.

At block 1002B, the base station receives, from a CN (e.g., the CN 110), a first CN to BS interface message requesting configuration of radio resources for a PDU session of a UE (e.g., the UE 102, 102A, 102B, or 102C) (e.g., event 306A, 322B, 322C or similar events within procedures 350B, 350C, 450A-C, or 550). At block 1004B, the base station transmits to the UE a first RRC reconfiguration message including multicast configuration parameters, in response to the CN to BS interface message (e.g., events 310A, 324B, 324C, 442A. 442B, or 542, or similar events within procedures 350B, 350C, 450A-C, or 550). The base station then transmits at block 1006B MBS packets of an MBS service to the UE using the multicast configuration parameters (e.g., events 338A-C, 428, 528). Subsequently to block 1006B, at block 1008B, the base station transmits to the UE a second RRC reconfiguration message including unicast configuration parameters (e.g., events 310A, 324B, 324C, 452C, or 542, or similar events within procedures 350B, 350C, 450A-C, or 550). At block 1010B, the base station transmits MBS packets of the MBS service to the UE using the unicast configuration parameters (e.g., events 338A-C, 438, 528).

Figure 10C:
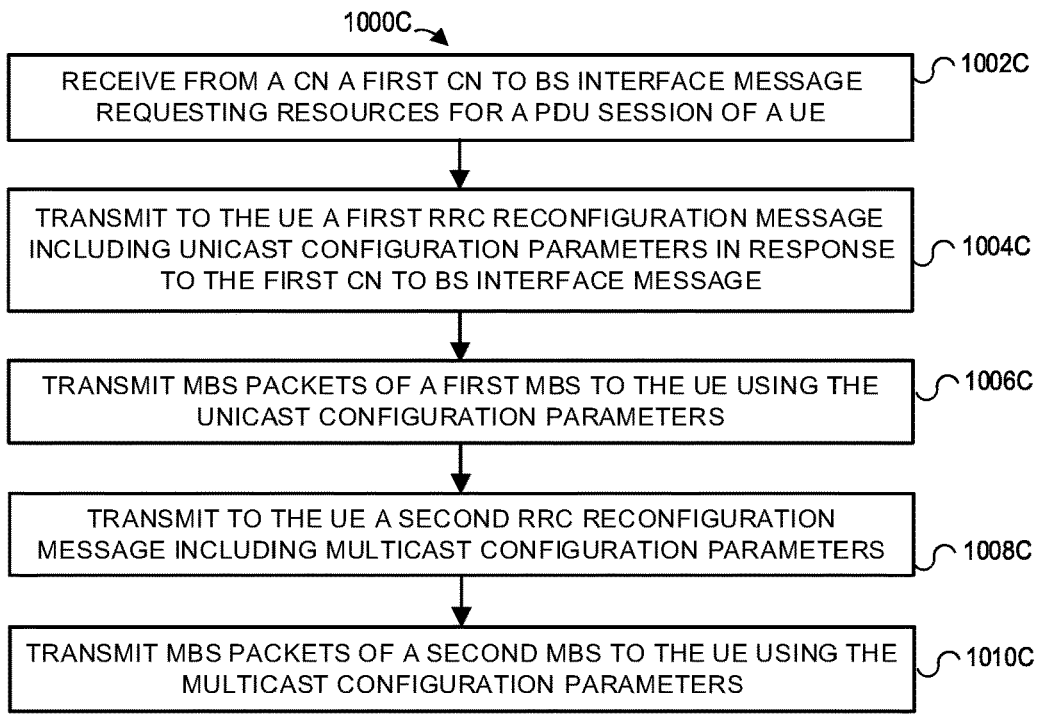
FIG. 10C is a flow diagram of an example method similar to the method of FIG. 10A, but where the base station transmits MBS packets of a first MBS service in accordance with the unicast configuration parameters, and transmits MBS packets of a second MBS service in accordance with the multicast configuration parameters.

FIG. 10C illustrates an example method 1000C that can be implemented in a base station (e.g., the base station 104, 106A, or 106B). The method 1000C is similar to the methods 1000A and 1000B, except that the base station initially transmits MBS packets of a first MBS service in accordance with unicast configuration parameters, and subsequently transmits MBS packets of a second MBS service in accordance with multicast configuration parameters. Likewise, the method 1000C is similar to the method 700C, but the method 1000C includes steps implemented by the base station rather than the UE.

At block 1002C, the base station receives, from a CN (e.g., the CN 110), a first CN to BS interface message requesting configuration of radio resources for a PDU session of a UE (e.g., the UE 102, 102A, 102B, or 102C) (e.g., event 306A, 322B, 322C or similar events within procedures 350B, 350C, 450A-C, or 550). At block 1004C, the base station transmits to the UE a first RRC reconfiguration message including unicast configuration parameters, in response to the CN to BS interface message (e.g., events 310A, 324B, 324C, 452C, or 542, or similar events within procedures 350B, 350C, 450A-C, or 550). The base station then transmits at block 1006C MBS packets of a first MBS service to the UE using the unicast configuration parameters (e.g., events 338A-C, 438, 528). At block 1008C, the base station transmits to the UE a second RRC reconfiguration message including multicast configuration parameters (e.g., events 310A, 324B, 324C, 442A, 442B, or 542, or similar events within procedures 350B, 350C, 450A-C, or 550). At block 1010C, the base station transmits MBS packets of a second MBS service to the UE using the multicast configuration parameters (e.g., events 338A-C, 428, 528). While FIG. 10C illustrates using unicast configuration parameters to transmit a first MBS service and multicast configuration parameters to transmit a second MBS, the base station can implement a similar method to first use multicast configuration parameters to transmit the first MBS service, and subsequently use unicast configuration parameters to transmit the second MBS service. In some implementations, the base station stops transmitting MBS packets of the first MBS to the UE after transmitting MBS packets of the second MBS, e.g., if the UE switches to receiving MBS packets of the second MBS from the BS. In other implementations, the base station continues transmitting MBS packets of the first MBS to the UE if the UE is capable of simultaneously receiving the first MBS and second MBS or if the UE does not indicate that the UE is no longer interested in receiving the first MBS or does not indicate that the UE wishes to stop receiving the first MBS.

Figure 11:
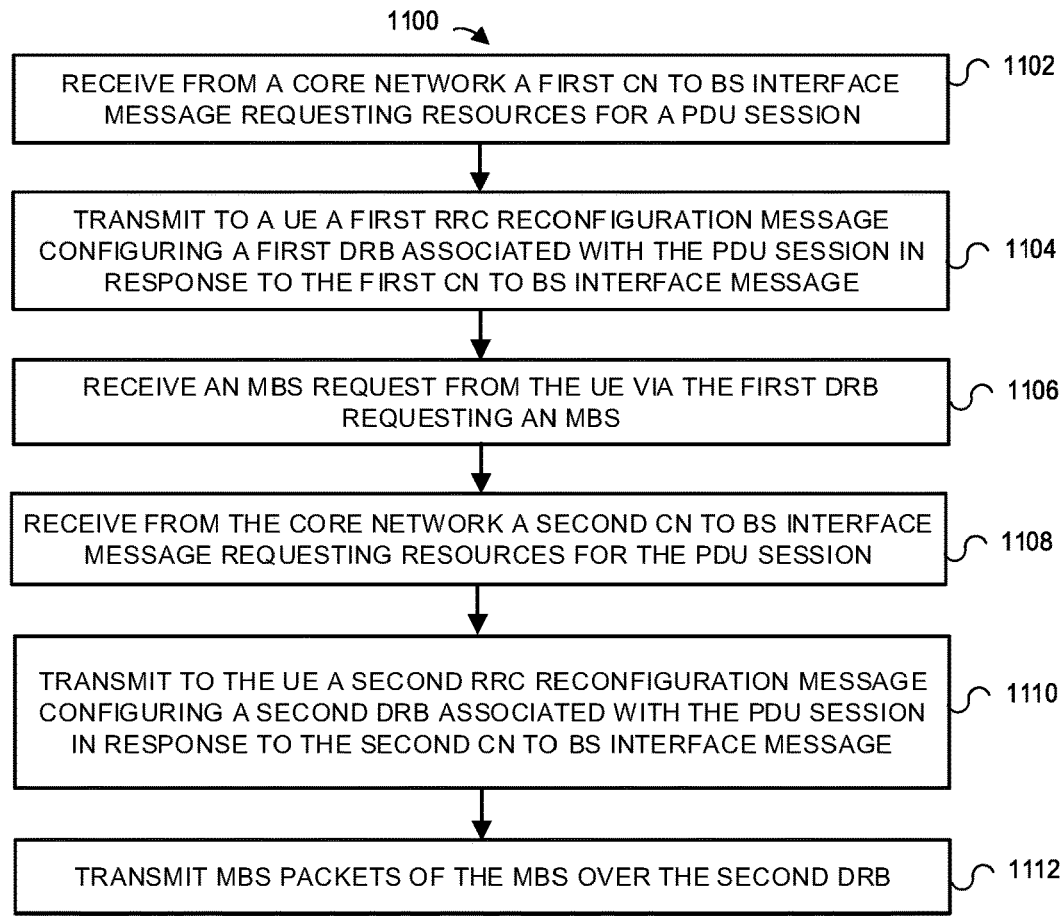
FIG. 11 is a flow diagram of an example method that includes receiving, over a first DRB associated with a PDU session, a request for an MBS service from a UE and transmitting MBS packets of the MBS over a second DRB associated with the PDU session, which can be implemented in a base station of FIG. 1A.

Turning to FIG. 11, an example method 1100 can be implemented in a base station (e.g., the base station 104, 106A, or 106B). The method 1100 is similar to the method 800, but the method 1100 includes steps implemented by the base station rather than the UE. At block 1102, the base station receives from a CN (e.g., the CN 110) a first CN to BS interface message requesting resources for a PDU session (e.g., event 306A or similar events during procedures 350B, 350C, 450A-C, or 550). At block 1104, the base station transmits to a UE (e.g., the UE 102, 102A, 102B, or 102C) a first RRC reconfiguration message configuring a first DRB (e.g., a unicast DRB or an MRB) associated with the PDU session (e.g., event 310 or similar events during procedures 350B, 350C, 450A-C, or 550). At block 1106, the base station receives an MBS request from the UE via the first DRB request an MBS service (e.g., events 314A-C). The base station may forward the MBS request to the CN (e.g., events 316A-C). At block 1108, the base station receives from the CN a second CN to BS interface message request resources for the PDU session (e.g., events 322B, 322C). In response, the base station transmits at block 1110 a second RRC reconfiguration message to the UE configuring a second DRB (e.g., a unicast DRB or an MRB) associated with the PDU session (e.g., events 342B, 342C). At block 1112, the base station transmits MBS packets of the MBS service over the second DRB to the UE (e.g., events 338B, 338C).

In some implementations, the CN can request configuration of radio resources for a first QoS flow and a second QoS flow in the first CN to BS interface message and second CN to BS interface message, respectively. Accordingly, the base station configures the first DRB for the first QoS flow and the second DRB for the second QoS flow in the first RRC reconfiguration message and the second RRC reconfiguration message, respectively. The CN sends MBS data packets of the MBS on the second QoS flow to the base station, which in turn transmits the MBS data packets of the MBS to the UE over the second DRB. The CN may transmit MBS control information of the MBS on the first QoS flow to the base station, which in turn transmits the MBS control information over the first DRB.

Figure 12:
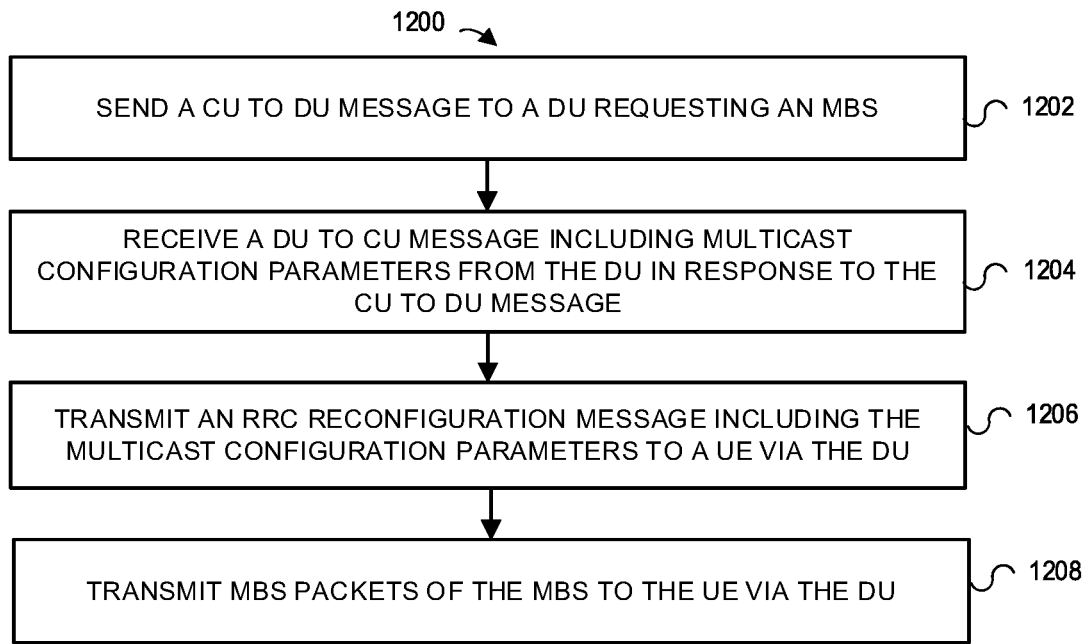
FIG. 12 is a flow diagram of an example method that includes requesting multicast configuration parameters for a UE from a DU and receiving the multicast configuration parameters from the DU, which can be implemented in a CU of FIG. 1B.

Referring next to FIG. 12, an example method 1200 can be implemented in a CU (e.g., the CU 172). At block 1202, the CU sends a CU to DU message to a DU (e.g., the DU 174) to request an MBS service (e.g., event 502). At block 1204, the CU receives a DU to CU message from the DU that includes multicast configuration parameters (e.g., event 504). Next, at block 1206, the CU transmits an RRC reconfiguration message including the multicast configuration parameters to a UE (e.g., the UE 102, 102A, 102B, or 102C) via the DU (e.g., events 506, 542). At block 1208, the CU transmits MBS packets of the MBS service to the UE via the DU (e.g., event 528).

Figure 13:
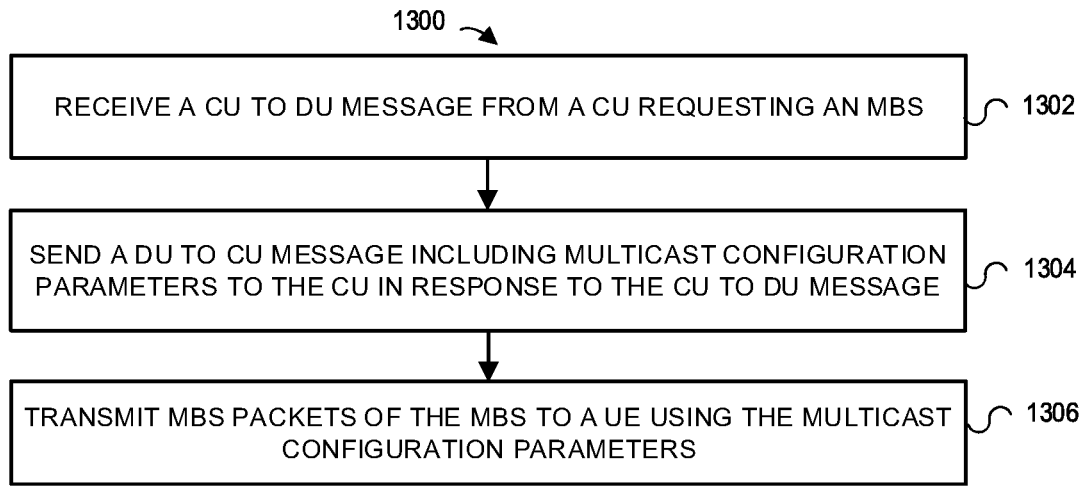
FIG. 13 is a flow diagram of an example method that includes receiving a request for multicast configuration parameters for a UE from a CU and transmitting the multicast configuration parameters to the CU, which can be implemented in a DU of FIG. 1B.

Referring next to FIG. 13, an example method 1300 can be implemented in a DU (e.g., the DU 174). At block 1302, the DU receives a CU to DU message from a CU (e.g., the CU 172) requesting an MBS service (e.g., event 502). At block 1304, the DU sends a DU to CU message including multicast configuration parameters to the CU in response to the CU to DU message (e.g., event 504). The DU can then transmit at block 1306 MBS packets of the MBS service to a UE (e.g., the UE 102, 102A, 102B, or 102C) using the multicast configuration parameters (e.g., event 528).

Figure 14:
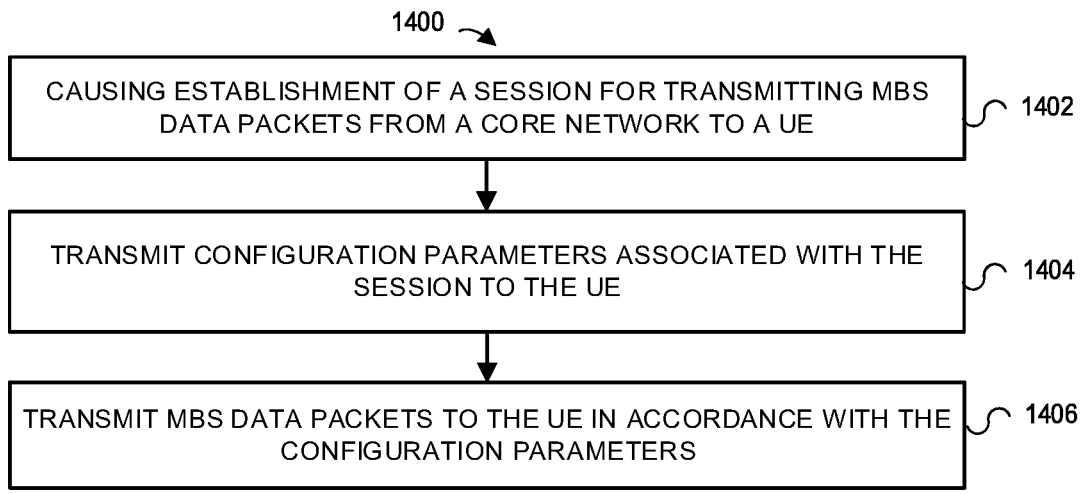
FIG. 14 is a flow diagram of an example method for managing communication of MBS, which can be implemented in a base station of FIG. 1A.

Turning to FIG. 14, an example method 1400 can be implemented in a base station (e.g., the base station 104, 106A, or 106B) for managing communication of MBS. The base station can perform the method 1400 using processing hardware (e.g., the processing hardware 130 or 140). At block 1402, the base station causes establishment of a session (e.g., a PDU session) for transmitting MBS data packets from a CN (e.g., the CN 110) to a UE (e.g., the UE 102, 102A, 102B, or 102C) (e.g., procedures 350B, 350C, 450A-C, or 550). Causing the establishment of the session may include configuring radio resources (e.g., DRBs) for the session. At block 1404, the base station transmits configuration parameters associated with the session to the UE (e.g., events 310A, 324B, 324C, 452C, 442A, 442B, or 542, or similar events within procedures 350B, 350C, 450A-C, or 550). The configuration parameters can be unicast configuration parameters (e.g., parameters configuring a unicast DRB) or multicast configuration parameters (e.g., parameters configuring a multicast DRB, such as an MRB). At block 1406, the base station transmits MBS data packets to the UE in accordance with the configuration parameters (e.g., events 338A-C, 438, 428, 528).

Figure 15:
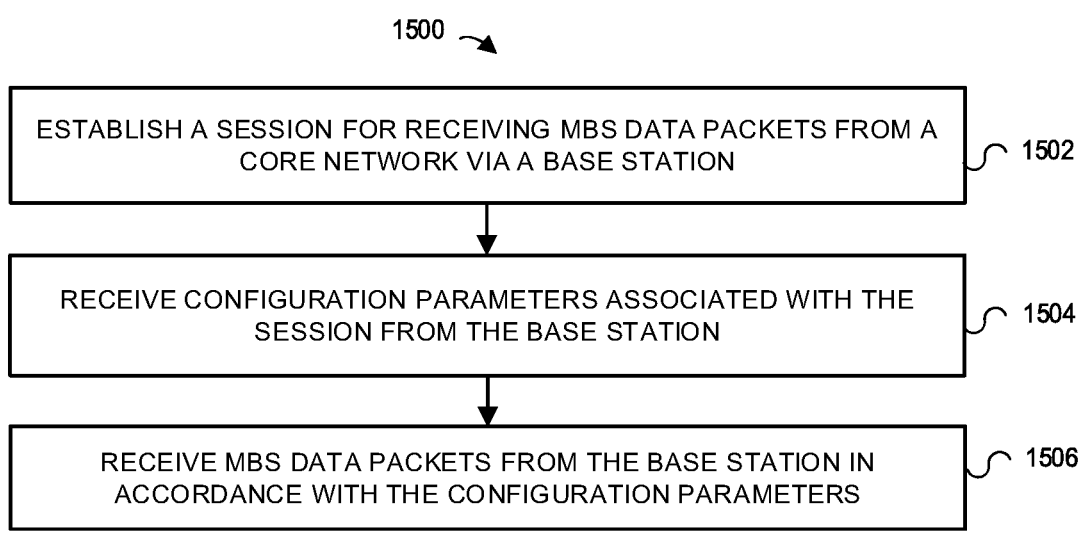
FIG. 15 is a flow diagram of an example method for managing reception of MBS, which can be implemented in a UE of FIG. 1A.

Referring next to FIG. 15, an example method 1500 can be implemented in a UE (e.g., the UE 102, 102A, 102B, or 102C) for managing reception of MBS. The UE can perform the method 1500 using processing hardware (e.g., the processing hardware 150). At block 1502, the UE establishes a session (e.g., a PDU session) for receiving MBS data packets from a CN (e.g., the CN 110) via a base station (e.g., the base station 104, 106A, or 106B) (e.g., procedures 350B, 350C, 450A-C, or 550). At block 1504, the UE receives configuration parameters associated with the session from the base station (e.g., events 310A, 324B, 324C, 452C, 442A, 442B, or 542, or similar events within procedures 350B, 350C, 450A-C, or 550). The configuration parameters can be unicast configuration parameters (e.g., parameters configuring a unicast DRB) or multicast configuration parameters (e.g., parameters configuring a multicast DRB, such as an MRB). At block 1506, the UE receives MBS data packets from the base station in accordance with the configuration parameters (e.g., events 338A-C, 438, 428, 528).

The following list of examples reflects a variety of the embodiments explicitly contemplated by the present disclosure:

Example 1. A method in a base station for managing communication of multicast and/or broadcast services (MBS), the method comprising: causing, by a processing hardware of the base station, establishment of a session for transmitting MBS data packets from a core network (CN) to a user equipment (UE); transmitting, by the processing hardware to the UE, configuration parameters associated with the session; and transmitting, by the processing hardware to the UE, the MBS data packets in accordance with the configuration parameters.

Example 2. The method of example 1, wherein causing the establishment of the session includes: configuring a unicast data radio bearer (DRB).

Example 3. The method of example 1, wherein causing the establishment of the session includes: configuring a multicast DRB.

Example 4. The method of example 1, wherein causing the establishment of the session includes: configuring a DRB for transmitting the MBS data packets and unicast data packets.

Example 5. The method of any one of examples 1-4, wherein the transmitting the MBS data packets occurs in response to receiving a request from the UE for an MBS service.

Example 6. The method of example 5, wherein: causing the establishment of the session includes configuring a data radio bearer (DRB) associated with the session; and receiving the request includes receiving the request over the DRB.

Example 7. The method of any one of examples 5 or 6, wherein: transmitting the configuration parameters includes transmitting the configuration parameters configuring a new DRB associated with the session subsequently to the establishment of the session; and transmitting the MBS data packets includes transmitting the MBS data packets over the new DRB.

Example 8. The method of example 5, wherein receiving the request includes receiving the request in a message associated with a protocol for controlling radio resources.

Example 9. The method of any one of claims 1-4, wherein the base station transmits the MBS data packets in response to receiving a message from the CN.

Example 10. The method of any one of the preceding examples, wherein: the session is associated with a first DRB; the method further comprising: receiving, by the processing hardware, a request from the UE for a unicast service; and transmitting, by the processing hardware to the UE, unicast configuration parameters for a second DRB over which the UE is to receive the unicast service.

Example 11. The method of any one of the preceding examples, wherein the UE is a first UE and the session is a first session, the method further comprising: causing, by the processing hardware, establishment of a second session for transmitting the MBS data packets from the CN to a second UE; and transmitting, by the processing hardware to a second UE, unicast configuration parameters configuring a second unicast DRB for transmitting the MBS data packets to the second UE.

Example 12. The method of any one of examples 1-10, wherein the UE is a first UE and the session is a first session, the method further comprising: causing, by the processing hardware, establishment of a second session for transmitting the MBS data packets from the CN to a second UE; and transmitting, by the processing hardware to the second UE, the configuration parameters.

Example 13. The method of any one of examples 1 or 3-12, wherein transmitting the MBS data packets includes (i) transmitting the MBS data packets over a multicast DRB to a first subset of UEs including the UE, and (ii) transmitting the MBS data packets over unicast DRBs to respective UEs of a second subset of UEs.

Example 14. The method of any one of the preceding examples, wherein the MBS packets are first MBS packets of a first MBS service, and the configuration parameters are first configuration parameters, the method further comprising: transmitting, by the processing hardware to the UE, second configuration parameters associated with the session; and transmitting, by the processing hardware, second MBS packets of a second MBS service to the UE in accordance with the second configuration parameters.

Example 15. The method of any one of examples 1-13, wherein transmitting the MBS packets includes transmitting first MBS packets of a first MBS and second MBS packets of a second MBS.

Example 16. The method of any one of examples 1-15, including: transmitting, by the processing hardware, from a central unit (CU) of the base station to a distributed unit (DU) of the base station, a CU-to-DU message requesting the configuration parameters the UE is to use to receive the MBS data packets; receiving, by the processing hardware, the configuration parameters at the CU from the DU; transmitting the configuration parameters to the UE from the CU via the DU; and transmitting the MBS data packets to the UE from the CU via the DU.

Example 17. The method of any one of the preceding examples, further comprising: transmitting, by the processing hardware to the UE, application-level messages related to the MBS packets using the session.

Example 18. The method of example 17, wherein transmitting the application-level messages includes transmitting security keys related to the MBS packets.

Example 19. The method of any one of the preceding examples, wherein causing the establishment of the session includes causing the establishment of a protocol data unit (PDU) session.

Example 20. The method of any one of the preceding examples, wherein transmitting the configuration parameters includes transmitting the configuration parameters in a message associated with a protocol for controlling radio resources.

Example 21. A base station including processing hardware and configured to implement a method according to any one of the preceding examples.

Example 22. A method in a user equipment (UE) for managing reception of multicast and/or broadcast services (MBS), the method comprising: establishing, by a processing hardware of the UE, a session for receiving MBS data packets from a core network (CN) via a base station; receiving, by the processing hardware from the base station, configuration parameters associated with the session; and receiving, by the processing hardware from the base station, the MBS data packets in accordance with the configuration parameters.

Example 23. The method of example 22, wherein establishing the session includes: configuring a unicast data radio bearer (DRB).

Example 24. The method of example 22, wherein establishing the session includes: configuring a multicast DRB.

Example 25. The method of example 22, wherein establishing the session includes: configuring a DRB for receiving the MBS data packets and unicast data packets.

Example 26. The method of any one of examples 22-25, further comprising: transmitting, by the processing hardware to the base station, a request for an MBS service prior to receiving the MBS packets.

Example 27. The method of example 26, wherein: establishing the session includes configuring a data radio bearer (DRB) associated with the session; and transmitting the request includes transmitting the request over the DRB.

Example 28. The method of any one of examples 26 or 27, wherein: receiving the configuration parameters includes receiving, subsequently to establishing the session, the configuration parameters that configure a new DRB associated with the session; and receiving the MBS data packets includes receiving the MBS data packets over the new DRB.

Example 29. The method of example 26, wherein transmitting the request includes transmitting the request in a message associated with a protocol for controlling radio resources.

Example 30. The method of any one of examples 22-29, wherein: the session is associated with a first DRB; the method further comprising: transmitting, by the processing hardware, a request to the base station for a unicast service; and receiving, by the processing hardware from the base station, unicast configuration parameters for a second DRB over which the UE is to receive the unicast service.

Example 31. The method of any one of examples 22-30, wherein the MBS packets are first MBS packets of a first MBS service, and the configuration parameters are first configuration parameters, the method further comprising: receiving, by the processing hardware from the base station, second configuration parameters associated with the session; and receiving, by the processing hardware, second MBS packets of a second MBS from the base station in accordance with the second configuration parameters.

Example 32. The method of any one of examples 22-31, wherein receiving the MBS packets includes receiving first MBS packets of a first MBS and second MBS packets of a second MBS.

Example 33. The method of any one of examples 22-32, further comprising: receiving, by the processing hardware from the base station, application-level messages related to the MBS packets using the session.

Example 34. The method of example 33, wherein receiving the application-level messages includes receiving security keys related to the MBS packets.

Example 35. The method of any one of examples 22-34, wherein establishing the session includes establishing a protocol data unit (PDU) session.

Example 36. The method of any one of examples 22-35, wherein receiving the configuration parameters includes receiving the configuration parameters in a message associated with a protocol for controlling radio resources.

Example 37. A user equipment (UE) including processing hardware and configured to implement a method according to any one of examples 22-36.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for communicating MBS information through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method in a base station for managing communication of multicast and/or broadcast services (MBS), the method comprising:
   causing establishment of a first protocol data unit (PDU) session for transmitting MBS data packets of an MBS service from a core network (CN) to a first user equipment (UE), the causing including
   receiving, from the first UE, a first request to establish the first PDU session, the first request indicating the MBS service, and
   transmitting the first request to the CN;
   transmitting, to the first UE, configuration parameters associated with the first PDU session;
   causing establishment of a second PDU session for transmitting the MBS data packets from the CN to a second UE, the causing including
   receiving, from the second UE, a second request to establish the second PDU session, the second request indicating the MBS service, and
   transmitting the second request to the CN;
   transmitting, to the second UE, the configuration parameters; and
   transmitting, to the first UE and the second UE, the MBS data packets in accordance with the configuration parameters.

2. The method of claim 1, wherein causing the establishment of the first PDU session includes:
   configuring a DRB for transmitting the MBS data packets and unicast data packets.

3. The method of claim 1, wherein the first PDU session is associated with a first DRB, the method further comprising:
   receiving a request from the first UE for a unicast service; and
   transmitting, to the first UE, unicast configuration parameters for a second DRB over which the first UE is to receive the unicast service.

4. The method of claim 1, wherein transmitting the MBS data packets includes (i) transmitting the MBS data packets over a multicast DRB to a first subset of UEs including the first UE and the second UE, and (ii) transmitting the MBS data packets over unicast DRBs to respective UEs of a second subset of UEs.

5. The method of claim 1, wherein the MBS packets are first MBS packets of a first MBS service, and the configuration parameters are first configuration parameters, the method further comprising:
   transmitting, to the first UE, second configuration parameters associated with the first PDU session; and
   transmitting by the processing hardware, second MBS packets of a second MBS service to the first UE in accordance with the second configuration parameters.

6. The method of claim 1, including:
   transmitting from a central unit (CU) of the base station to a distributed unit (DU) of the base station, a CU-to-DU message requesting the configuration parameters the first UE is to use to receive the MBS data packets;
   receiving the configuration parameters at the CU from the DU;
   transmitting the configuration parameters to the first UE from the CU via the DU; and
   transmitting the MBS data packets to the first UE from the CU via the DU.

7. The method of claim 1, further comprising:
transmitting, to the first UE, application-level messages related to the MBS packets using the first PDU session.

8. The method of claim 7, wherein transmitting the application-level messages includes transmitting security keys related to the MBS packets.

9. The method of claim 1, wherein transmitting the configuration parameters to the first UE includes transmitting the configuration parameters in a message associated with a protocol for controlling radio resources.

10. A base station including processing hardware and configured to:
cause establishment of a first protocol data unit (PDU) session for transmitting MBS data packets of an MBS service from a core network (CN) to a first user equipment (UE), including:
receive, from the first UE, a first request to establish the first PDU session, the first request indicating the MBS service, and
transmit the first request to the CN;
transmit, to the first UE, configuration parameters associated with the first PDU session;
cause establishment of a second PDU session for transmitting the MBS data packets from the CN to a second UE, including:
receive, from the second UE, a second request to establish the second PDU session, the second request indicating the MBS service, and
transmit the second request to the CN;
transmit, to the second UE, the configuration parameters; and
transmit, to the first UE and the second UE, the MBS data packets in accordance with the configuration parameters.

11. The base station of claim 10, wherein to cause the establishment of the first PDU session, the base station configures a DRB for transmitting the MBS data packets and unicast data packets.

12. The base station of claim 10,
wherein the first PDU session is associated with a first DRB, the base station further configured to:
receive a request from the first UE for a unicast service; and
transmit, to the first UE, unicast configuration parameters for a second DRB over which the first UE is to receive the unicast service.

13. The base station of claim 10, wherein to transmit the MBS data packets, the base station is configured to:
transmit the MBS data packets over a multicast DRB to a first subset of UEs including the first UE and the second UE, and
transmit the MBS data packets over unicast DRBs to respective UEs of a second subset of UEs.

14. The base station of claim 10, wherein:
the MBS packets are first MBS packets of a first MBS service, and the configuration parameters are first configuration parameters, the base station further configured to:
transmit, to the first UE, second configuration parameters associated with the first PDU session; and
transmit second MBS packets of a second MBS service to the first UE in accordance with the second configuration parameters.

15. The base station of claim 10, further configured to:
transmit, from a central unit (CU) of the base station to a distributed unit (DU) of the base station, a CU-to-DU message requesting the configuration parameters the first UE is to use to receive the MBS data packets;
receive the configuration parameters at the CU from the DU;
transmit the configuration parameters to the first UE from the CU via the DU; and
transmit the MBS data packets to the first UE from the CU via the DU.

16. A method in a user equipment (UE) for managing reception of multicast and/or broadcast services (MBS), the method comprising:
establishing a protocol data unit (PDU) session for receiving MBS data packets of an MBS service from a core network (CN) via a base station, the establishing including
transmitting, to the base station, a request to establish the PDU session, the request indicating the MBS service, and
receiving, from the base station, multicast configuration parameters associated with the PDU session;
receiving, from the base station, the MBS data packets in accordance with the multicast configuration parameters;
receiving, from the base station, unicast configuration parameters associated with the PDU session; and
receiving, from the base station, the MBS data packets in accordance with the unicast configuration parameters.

17. The method of claim 16, wherein receiving the unicast configuration parameters includes:
receiving the unicast configuration parameters configuring a unicast data radio bearer (DRB).

18. The method of claim 16, wherein receiving the multicast configuration parameters includes:
receiving the multicast configuration parameters configuring a multicast DRB.

19. The method of claim 16, wherein receiving the multicast configuration parameters includes receiving the multicast configuration parameters in a message associated with a protocol for controlling radio resources.

* * * * *